Jan. 30, 1951   R. D. DODGE   2,540,027
TYPEWRITER PUNCH
Filed Dec. 21, 1945   10 Sheets-Sheet 2

Jan. 30, 1951  R. D. DODGE  2,540,027
TYPEWRITER PUNCH
Filed Dec. 21, 1945  10 Sheets-Sheet 3
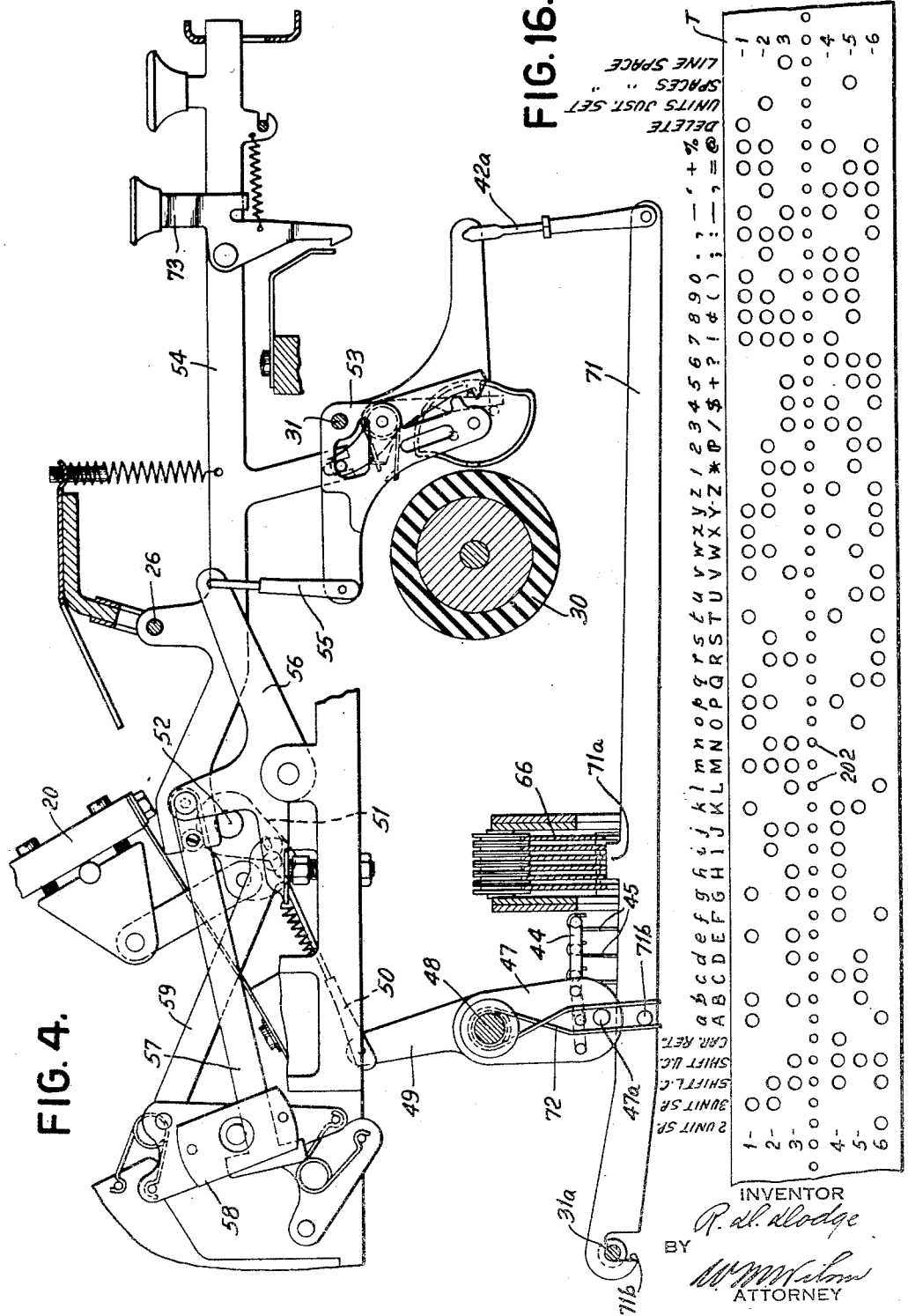

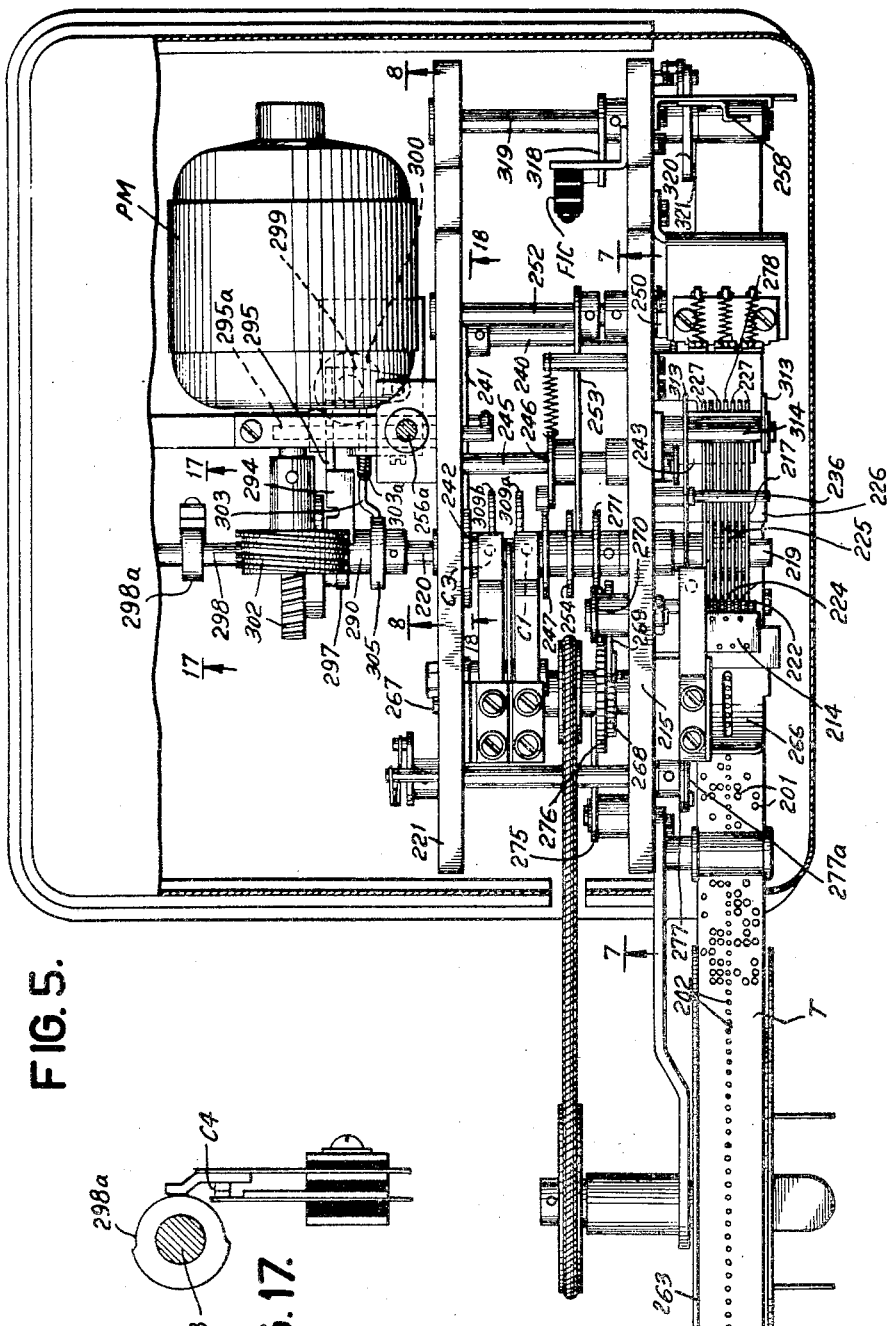
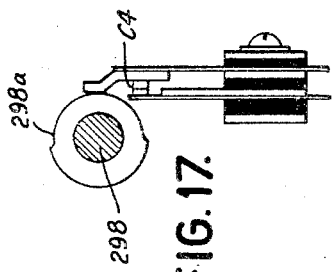

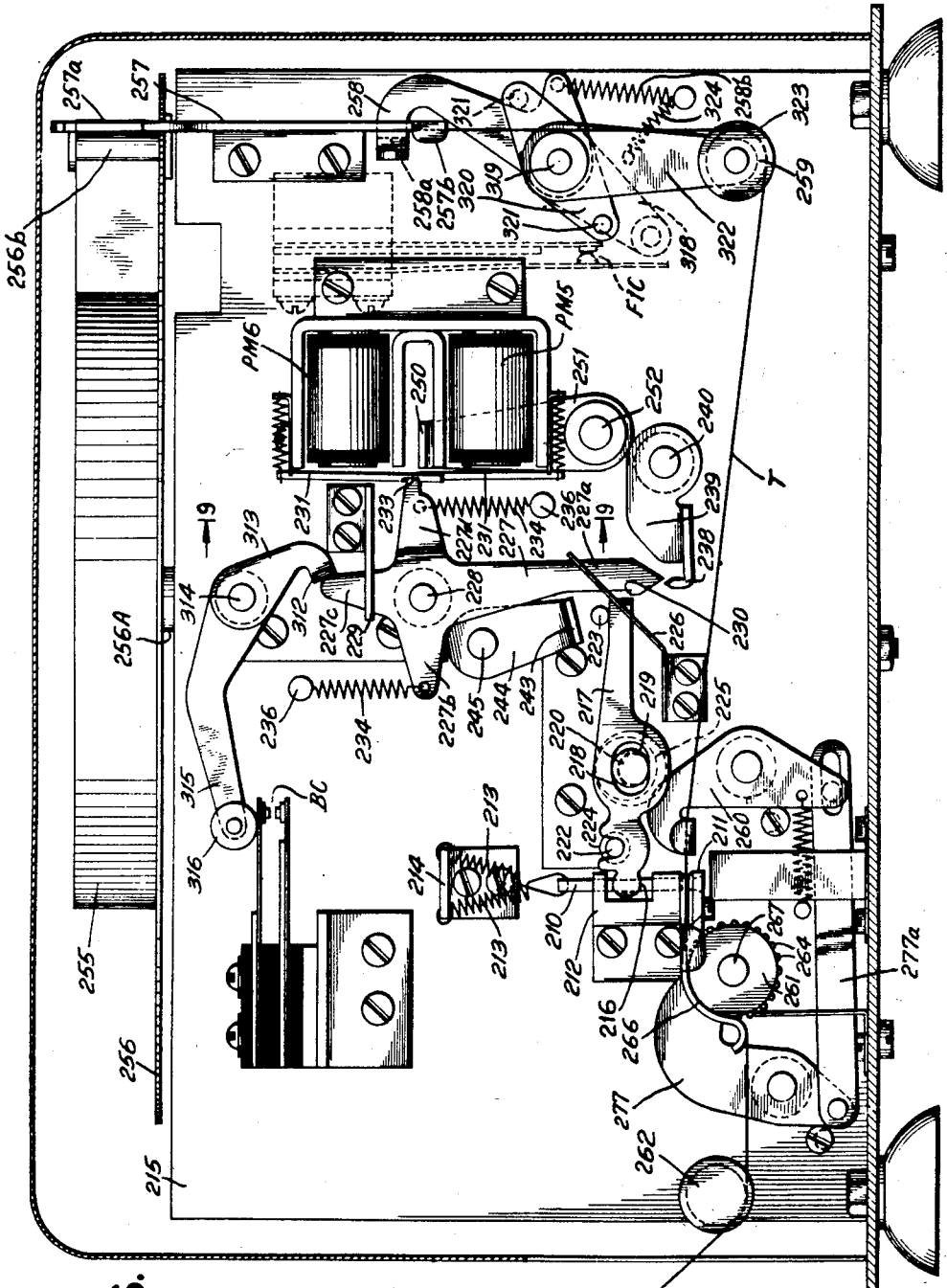

Jan. 30, 1951  R. D. DODGE  2,540,027
TYPEWRITER PUNCH
Filed Dec. 21, 1945  10 Sheets-Sheet 6
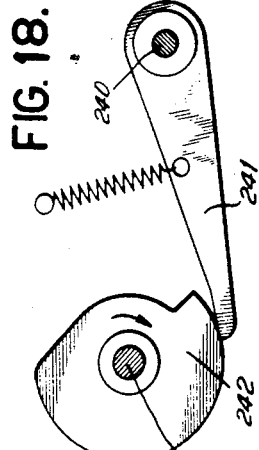
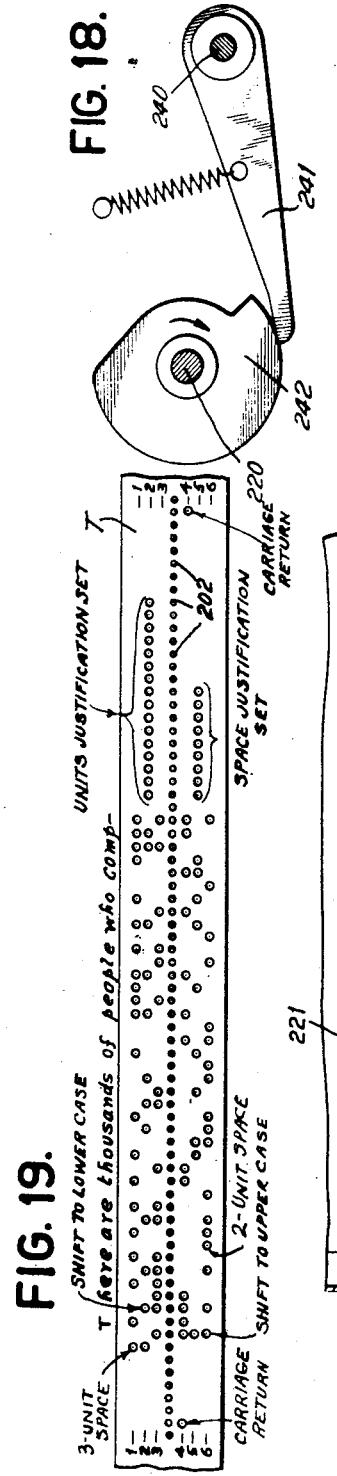
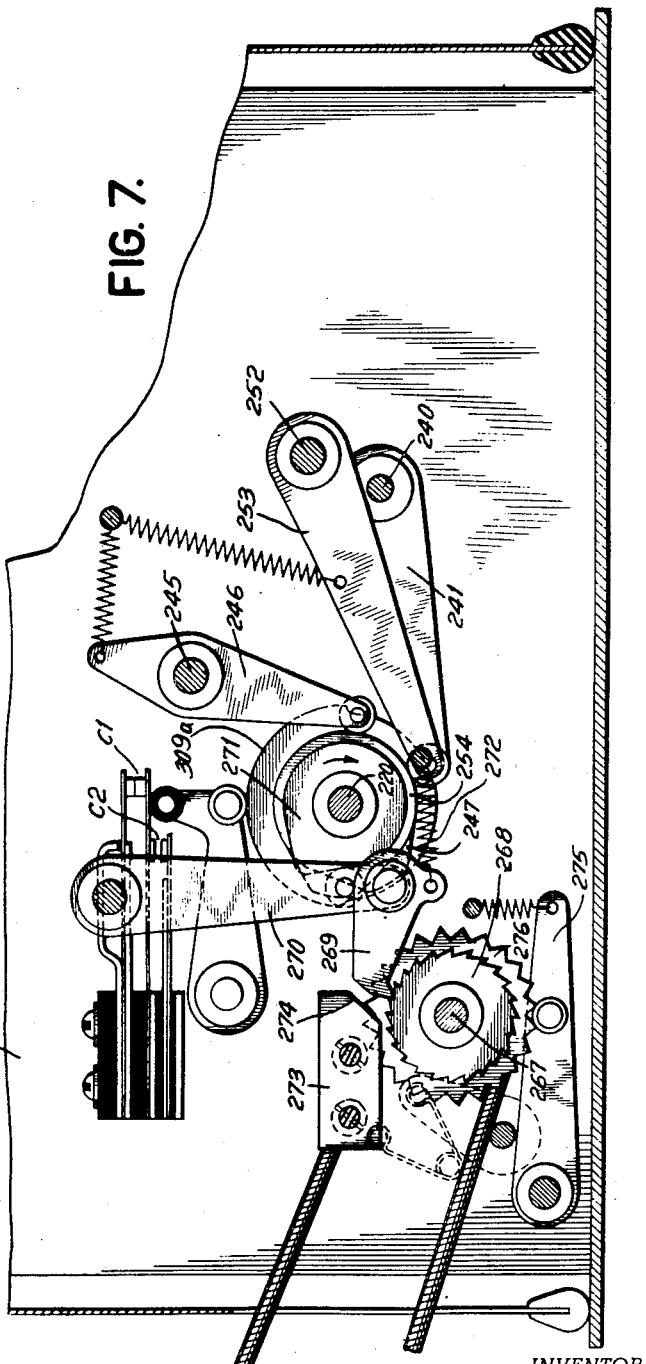
INVENTOR
R. D. Dodge
BY
ATTORNEY Jan. 30, 1951 R. D. DODGE 2,540,027
TYPEWRITER PUNCH
Filed Dec. 21, 1945 10 Sheets-Sheet 7
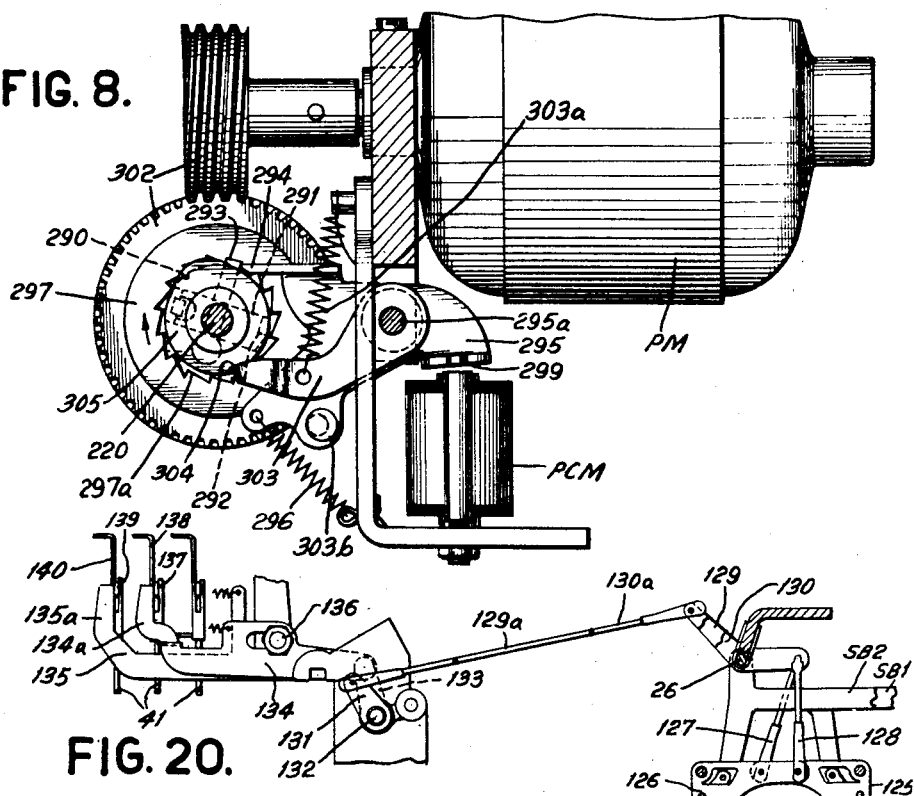
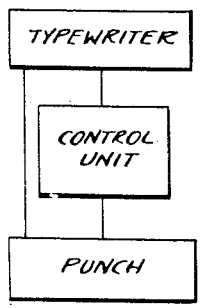
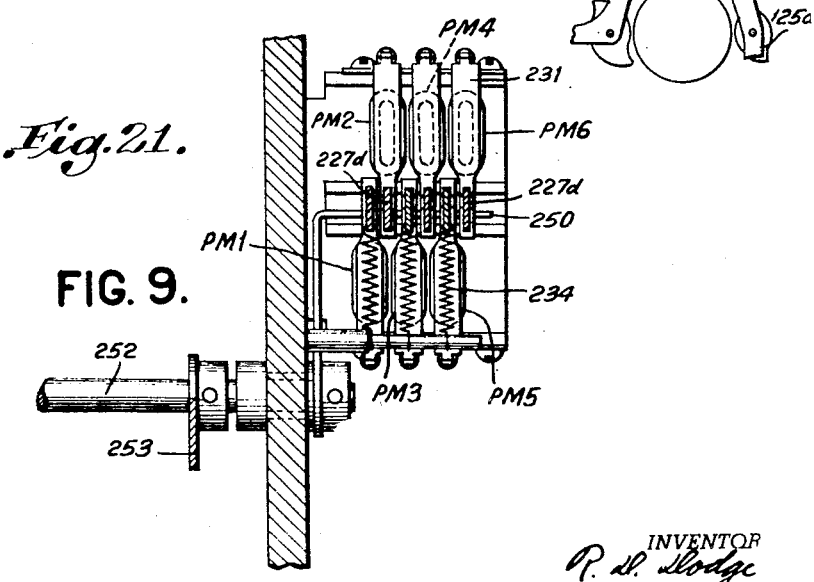
INVENTOR
R. D. Dodge
BY
W. M. Wilson
ATTORNEY Jan. 30, 1951　　　　R. D. DODGE　　　　2,540,027
TYPEWRITER PUNCH
Filed Dec. 21, 1945　　　　　　　　　　10 Sheets-Sheet 8
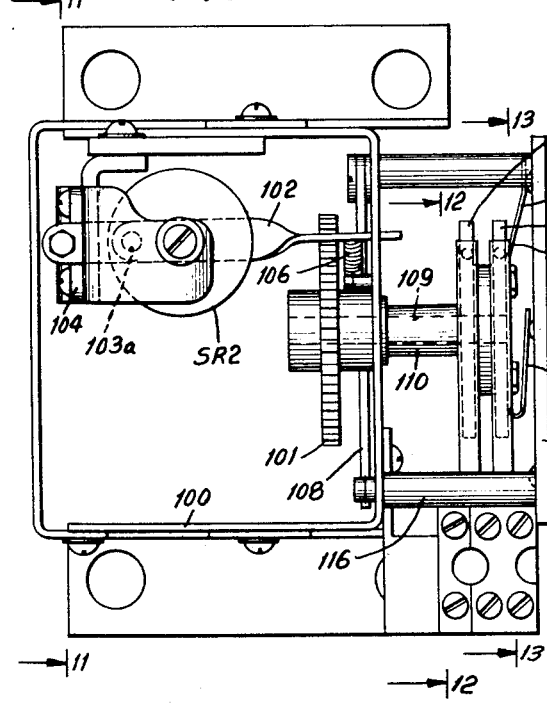
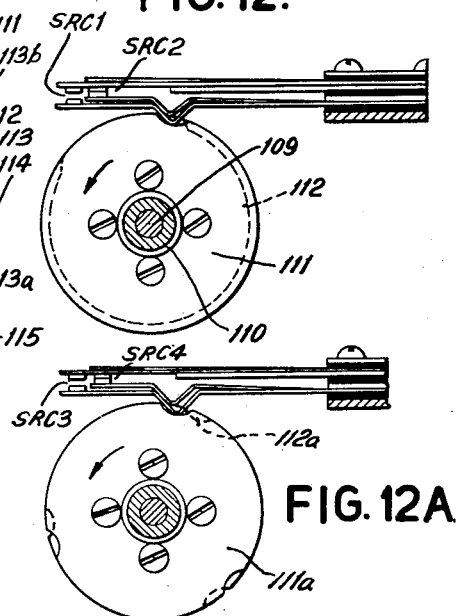
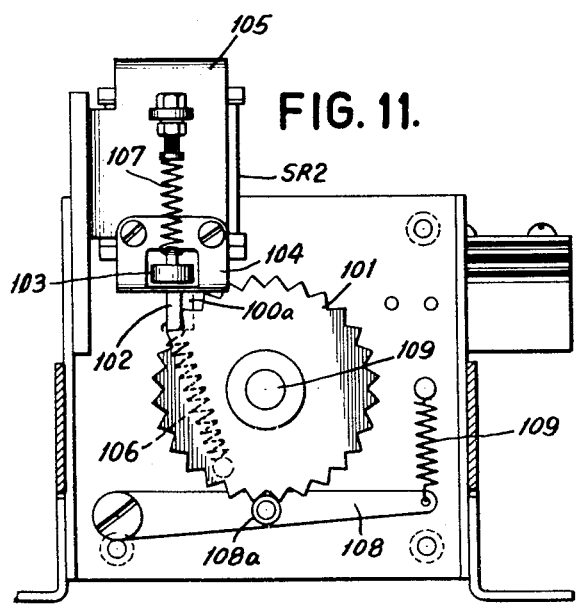
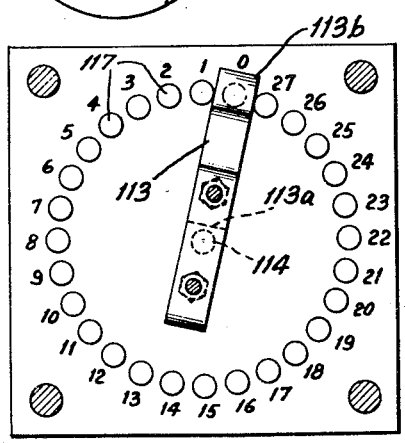
INVENTOR
R. D. Dodge
BY
ATTORNEY Jan. 30, 1951  R. D. DODGE  2,540,027
TYPEWRITER PUNCH
Filed Dec. 21, 1945  10 Sheets-Sheet 9

INVENTOR
R. D. Dodge
BY
ATTORNEY

Jan. 30, 1951 R. D. DODGE 2,540,027
TYPEWRITER PUNCH
Filed Dec. 21, 1945 10 Sheets-Sheet 10

INVENTOR
R. D. Dodge
BY
ATTORNEY

Patented Jan. 30, 1951

2,540,027

UNITED STATES PATENT OFFICE 2,540,027

TYPEWRITER PUNCH

Ronald D. Dodge, Poughkeepsie, N. Y., assignor to International Business Machines Corporation, New York, N. Y., a corporation of New York Application December 21, 1945, Serial No. 636,524

15 Claims. (Cl. 164—113)

This invention relates to machines for producing record media suitable for automatically controlling typewriting machines.

The principal object of the invention is to provide a machine for producing designations on record media such as strips or tapes like those capable of automatically controlling a typewriting or like printing machine.

An object is to provide an improved apparatus for producing the control strips or tapes used in automatic typewriter systems.

An object is to provide a typewriter-controlled machine for producing a record strip suitable for use in automatically controlling an automatic justifying typewriter.

An object is to provide an improved machine for producing perforated control strips for automatic typewriters, particularly justifying typewriters.

An object is to provide a typewriter-controlled machine for automatically measuring the amount of justification of each line of draft written on the controlling typewriter and automatically, by means of an initiating key, producing in a record medium, such as a strip or tape, designations representing the required amount of justification.

An object is to provide a machine of the above mentioned types with means for nullifying the effect of an erroneously designated section or portion of the record medium whereby that section will be ineffective and skipped when the record medium is used in an automatic record-controlled justifying system.

An object is to provide for the punching of the factors of justification as separate successions of holes in which the numbers of holes have a definite significance to enable a simple means of setting the justification computing means of an automatic justifying typewriter to be used in such typewriter, thereby reducing its cost.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1A is a detail large scale view of the lugs on the selector bars.

Fig. 4 is a large scale view of the shift mechanism in the typewriter.

Fig. 5 is a plan view of the punch mechanism with the case partly in section.

Fig. 6 is a front elevation of the punch mechanism showing the punch selecting mechanism.

Fig. 7 is a vertical section on the line 7—7 in Fig. 5.

Fig. 8 is a vertical section on the line 8—8 in Fig. 5.

Fig. 9 is a vertical section on the line 9—9 in Fig. 6.

Fig. 10 is a plan view of one of the stepping relays.

Fig. 11 is a vertical section on the line 11—11 in Fig. 10.

Fig. 12 is a vertical section on the line 12—12 in Fig. 10.

Fig. 12A is a view similar to Fig. 12 but showing the cams for the second stepping relay.

Fig. 13 is a vertical section on the line 13—13 in Fig. 10.

Figure 14A:
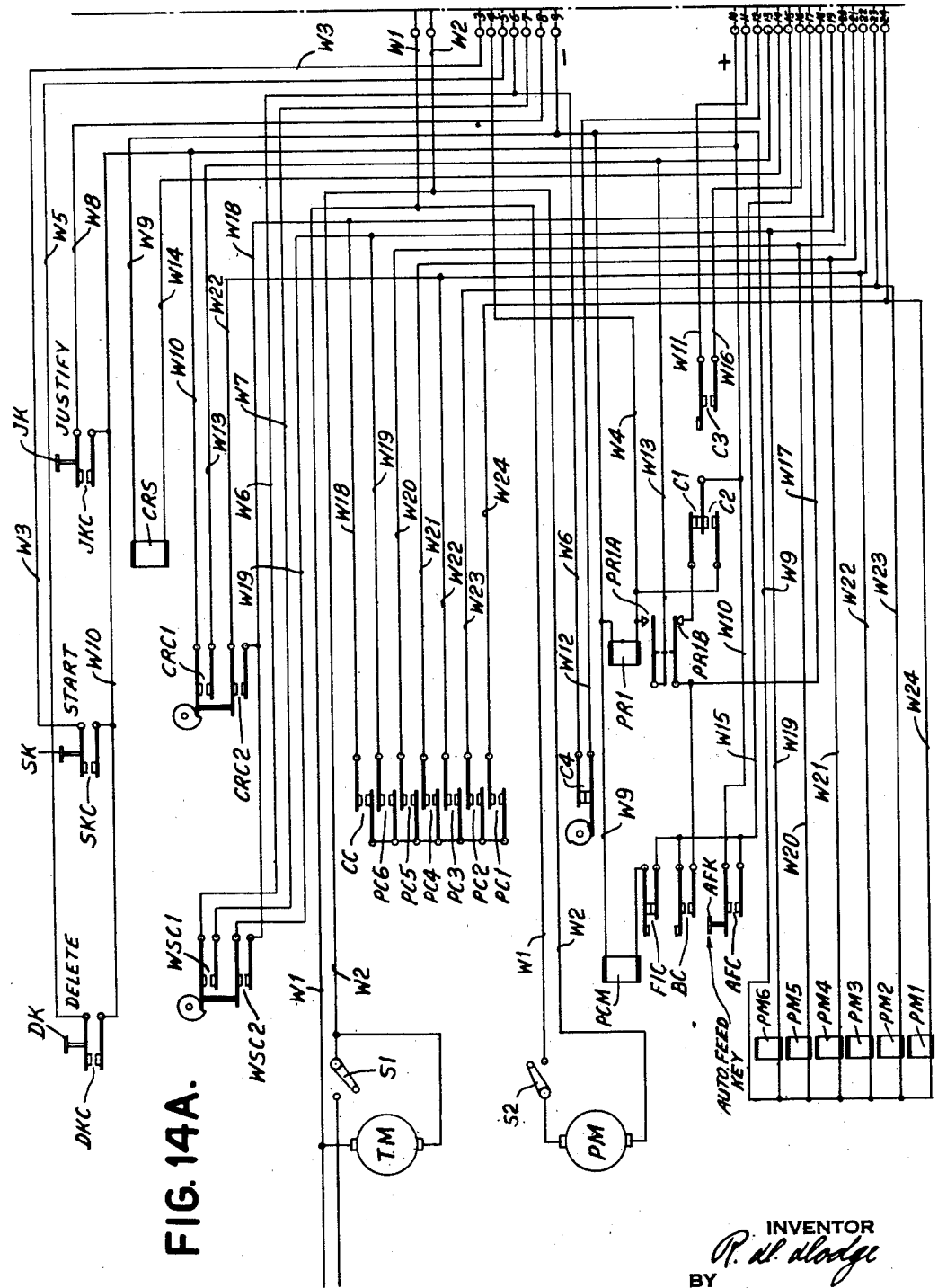
Figure 14B:
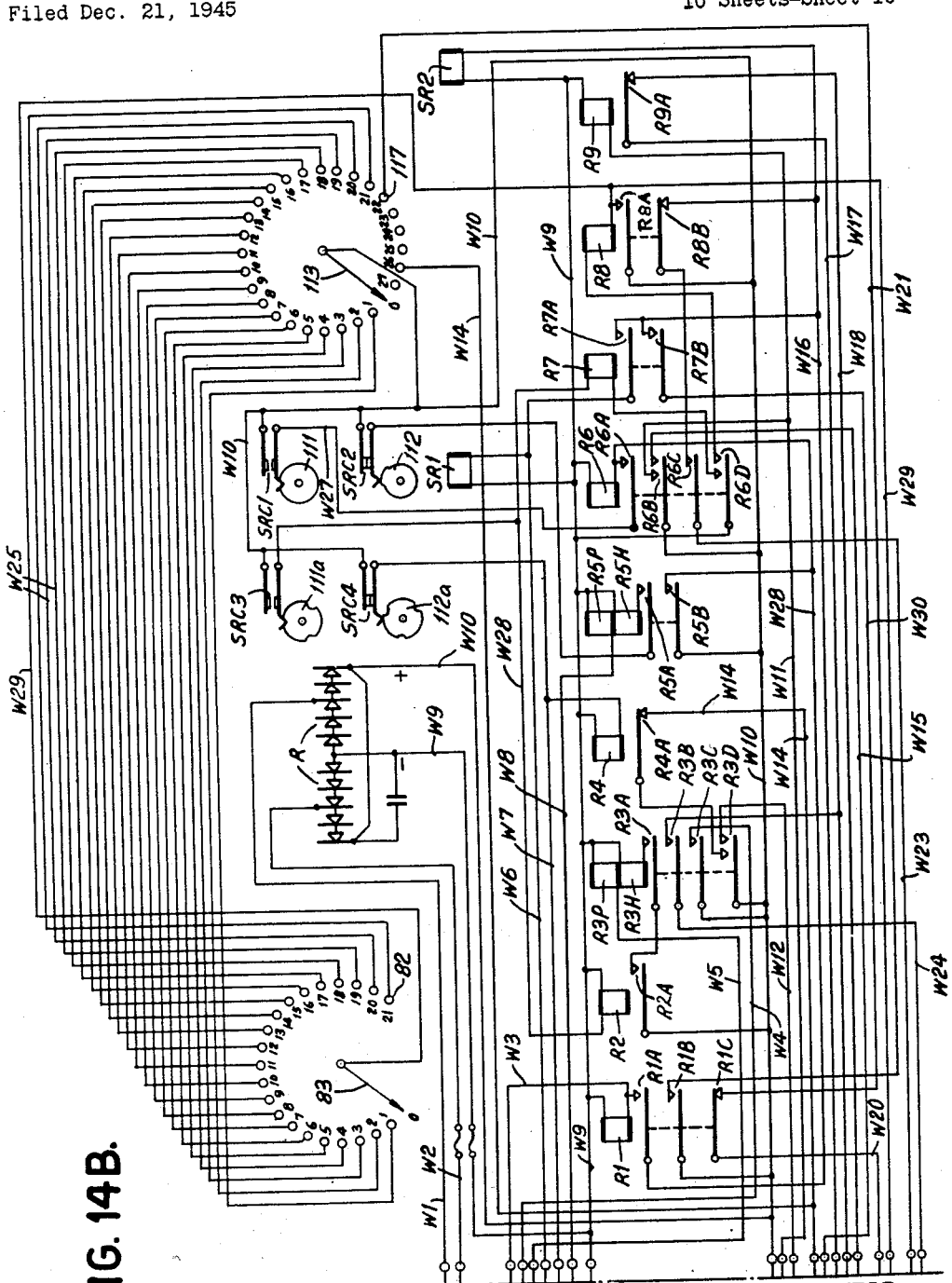

Figs. 14A and 14B together form a wiring diagram of the machine.

Fig. 15 is a plan view of the dial switch actuated by the typewriter carriage.

Fig. 16 is a large scale view of a section of the perforated tape showing the complete code perforated therein.

Fig. 17 is a vertical section on the line 17—17 in Fig. 5.

Fig. 18 is a vertical section on the line 18—18 in Fig. 5.

Fig. 19 is a specimen of the tape showing the holes punched to represent one complete line and the necessary justification holes.

Fig. 20 is a detail view of the space bar mechanism.

Fig. 21 is a schematic view illustrating the arrangement of the apparatus.

In the drawings the invention is shown as employing a typewriter of the type disclosed in Patent No. 2,224,766 and a perforating machine of the type disclosed in Patent No. 2,346,268.

However, it will be understood that these machines have been selected for convenience in illustrating the invention and either or both may be modified as to details or replaced by other suitable mechanisms and that the disclosure herein of a specified form of typewriter and specific form of perforating mechanism is not to be construed as a limitation upon the appended claims.

Since the typewriter is fully disclosed in the above patent, the description which immediately follows will be general and limited largely to such modifications in the machine as may be necessary to render it suitable for use in controlling a perforating mechanism to punch a tape which may be used in an automatic justifying machine.

The machine disclosed in the above patent is the well-known "Electromatic" power operated typewriter which has been modified in the disclosure of the patent to incorporate a variable spacing mechanism which varies the spacing of the characters printed according to their widths. Since the spacing mechanism is now well known only very brief mention of the principal parts of importance herein will be given.

Figure 1:
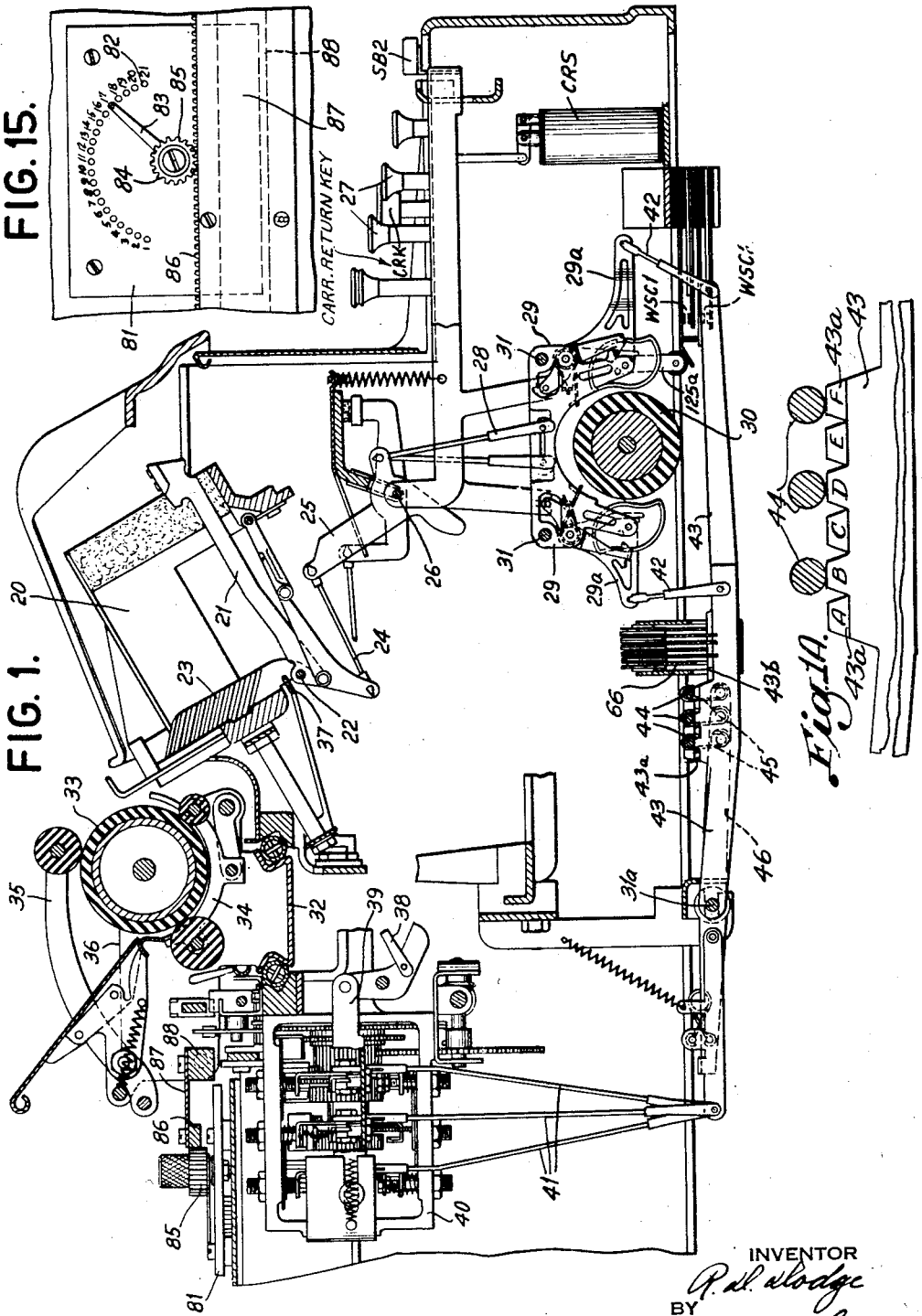
Fig. 1 is a vertical section approximately through the center of the typewriting machine.

As shown in Fig. 1, the typewriting machine includes the usual type basket 20 having the type bars 21 pivoted at 22 on the slotted type segment 23. Each type bar 21 is connected by a link 24 to a sub-lever 25 pivoted on a cross rod 26 which also pivots the keys 27 of the keyboard. Each sub-lever 25 is connected by a link 28 to a cam unit generally designated 29 similar to the ones disclosed in the first mentioned patent. The cam units cooperate with the usual power roller 30 and are operativey coupled thereto for operation thereby in a well-known way by means of the keys 27. The cam units 29 are staggered and pivotally mounted on the cross-rods 31. When a key 27 is depressed its associated cam unit 29 is caused to be operated by the power roller 30 thereby drawing down the links 28 and operating the associated type bar 21 in a well-known way.

The paper carriage 32 (Fig. 1) rotatably supports the platen 33, the paper deflector assembly 34, and paper bail 35, which are of usual construction and carried by the side plates 36 of the carriage.

Each type bar 21 (Fig. 1) actuates the usual universal bar 37 which has a connection to a link 38 for operating the horizontal slide 39. The latter actuates the escapements of the variable spacing mechanism, generally designated 40 in Fig. 1, in the manner described in Patent No. 2,224,766. The escapement mechanism includes a series of escapement selecting links 41 which may be pulled down singly or in different combinations to couple the escapements to the slide 39 as explained in Patent No. 2,224,766. These links 41 cause spacings of 2, 3, and 4 units of spacing, respectively, when operated singly and spacings of 5, 6, 7, and 9 units of spacing when operated in different combinations.

Each of the cam units 29 has an extension 29a (Fig. 1) connected by a link 42 to one of a series of selector bars 43 for selectively operating the links 41 through three bails 44. For this purpose each selector bar 43 has one or more lugs 43a in six positions designated A to F in Fig. 1 of which the lugs B, D, F normally cooperate with the bails 44 as shown in Fig. 1 when the type basket is in lower case or elevated position. The lugs 43a are disposed on the levers 43 as shown by the following table:

| Key | Lugs used | Spacing Upper case | Spacing Lower case |
|---|---|---|---|
| A | B, E | 4 | 3 |
| B | B, E | 4 | 3 |
| C | B, E | 4 | 3 |
| D | B, E | 4 | 3 |
| E | B, E | 4 | 3 |
| F | D, E | 4 | 2 |
| G | B, E | 4 | 3 |
| H | B, E | 4 | 4 |
| I | C, D | 2 | 2 |
| J | C, D | 2 | 2 |
| K | B, E | 4 | 3 |
| L | D, E | 4 | 2 |
| M | A, B, C, D | 5 | 5 |
| N | B, E | 4 | 3 |
| O | B, E | 4 | 3 |
| P | B, E | 4 | 3 |
| Q | B, E | 4 | 3 |
| R | B, E | 4 | 3 |
| S | A, B | 3 | 3 |
| T | B, E | 4 | 3 |
| U | B, E | 4 | 3 |
| V | B, E | 4 | 3 |
| W | A, C, F | 5 | 4 |
| X | B, E | 4 | 3 |
| Y | B, E | 4 | 3 |
| Z | B, E | 4 | 3 |
| *, 1 | A, B | 3 | 3 |
| ", 2 | A, B | 3 | 3 |
| /, 3 | A, B | 3 | 3 |
| $, 4 | B, E | 4 | 3 |
| †, 5 | A, B | 3 | 3 |
| ?, 6 | B, E | 4 | 3 |
| !, 7 | B, C | 2 | 3 |
| ¢, 8 | A, B | 3 | 3 |
| (, 9 | B, C | 2 | 3 |
| ), 0 | B, C | 2 | 3 |
| —, - | A, B | 3 | 3 |
| &, ‡ | B, E | 4 | 3 |
| +, = | A, B | 3 | 3 |
| @, % | A, B, C, D | 5 | 5 |
| #, § | A, B | 3 | 3 |
| :, , | C, D | 2 | 2 |
| ., . | C, D | 2 | 2 |
| ", ' | C, D | 2 | 2 |

In the case of the last eighteen keys given in the above table, the upper case character appears first. Thus, for the "*, 1" key, the asterisk is the upper case character.

When the type basket 20 is in normal position, the spacing of carriage 32 is controlled by one or more lugs 43a in the B, D, and F position as indicated in the next to the last column of the above table. Shifting the basket 20 to upper case position causes the bails 44 to be shifted into cooperation with lugs 43a in the A, C, and E positions to select carriage spacings as noted in the last column of the table. The manner in which the bails 44 are shifted will be described hereinafter.

It is apparent that when any cam unit 29 is operated by roller 30 it pulls upwardly on the link 42 and actuates one of the levers 43 thereby rocking one or more of the bails 44 in a counterclockwise direction (Fig. 1). Each bail 44 is connected by a link 45 to the right-hand arm of a lever 46, the left-hand arm of which is constructed similarly to the rear ends of the levers 133 to 135 of Patent 2,224,766 to provide a yielding connection of levers 43 at their left-hand ends to the links 41. Whenever one of the levers 43 is rocked counterclockwise by the operation of a cam unit 29 one or more of the bails 44 will be similarly rocked and, through the links 45, will rock the corresponding levers 46 in a counterclockwise direction thereby pulling down one or more of the links 41, according to the number of bails operated, which of course will depend upon the positions in which lugs 43a appear on the operated lever 43.

It will be seen that fundamentally the mechanism just described functions in substantially the same way as the mechanism disclosed in Patent No. 2,224,766 to select one or more of the escapement mechanisms for operation to space the carriage 32 an extent depending upon the width of the character to be printed.

For the purpose of changing the selection of the escapements whenever the type basket 20 is shifted downwardly to the upper case position, the bails 44 are pivoted at their ends to arms 47 (Figs. 1 and 4) secured to a cross shaft 48. Also secured to the shaft 48 is an arm 49 connected by a link 50 to an arm 51 secured to the cross shaft 52 of the usual shift mechanism. This cross shaft is rotated counterclockwise whenever the type basket is shifted to upper case position through the medium of shift mechanism of the well-known form disclosed in Patent 1,945,097. This shift mechanism is operated by a cam unit 53 (Fig. 4) which is controlled by the shift key 54 pivoted on the cross rod 26. The cam unit 53 is connected by a link 55 to a lever 56 forming part of the shift mechanism. This lever 56 is pivoted to the usual T-lever 57 which, in a well-known way, rotates the shaft 52 counterclockwise through the medium of the lever 58 and link 59. Since the shift mechanism is well known, it will not be described in further detail hereinafter. It is apparent from the foregoing description, when the type basket 20 is drawn downwardly (Fig. 4) by the operation of the shift mechanism arising from depression of the key 54, the shaft 48 will be rocked clockwise and will shift the bails 44 from registration with the B, D, and F lugs 43a to registration with the A, C, and E lugs. This changes the combination of bails 44 operated by the various levers 43 to effect different selections for the upper case characters. These spacings and the lugs which are effective for each key on the keyboard are shown in the second column of the foregoing table.

For the purpose of selecting the punches of the perforating mechanism, the cam units 29 and 53 operate a permutation bar mechanism selectively actuating permutation contacts which establish circuits to the punch magnets in a manner which will be described more fully hereinafter. The permutation bar mechanism is shown in Figs. 1 to 4 but is most clearly shown in Figs. 2 and 3, to which principal reference will be made. This permutation bar mechanism is mounted in the base of the machine just in the rear, that is, to the left (Fig. 1), of the rear row of cam units 29 and is operated by the levers 43. The permutation bar mechanism includes a pair of side plates 60 which are spaced apart at their right-hand ends by being secured to a block 61 fixed to the lower edge of the base 62 of the machine and at their left-hand ends by being secured to spaced ears 63a formed in a plate 63 fixed to the exterior of the base 62, the base having a suitable opening to accommodate the plate 60 and lugs 63a.

The plates 60 support four cross rods 64 (Fig. 3) on which freely rotate the rollers 65 which guide for horizontal movement six permutation bars 66. Each permutation bar 66 is provided with a restoring spring 67 which normally holds the right-hand end of the permutation bar against a stop 68 in the form of a cross bar secured to the plates 60. Each permutation bar 66 is formed with a lateral extension 66a, which extensions make various angles with the bodies of the bar so as to extend in fan-shaped array toward the left (Fig. 2) to a point outside the base 62. The ends of these extensions 66a are provided with insulating buttons 66b cooperating with the permutation contacts PC1 to PC6, the numbers designating the code positions 1 to 6 of the code (Fig. 16) which is punched in the tape T. For example, the contacts PC1 correspond to the "1" position in the tape T while the contacts PC6 correspond to the "6" position.

In order to selectively close the contacts PC1 to PC6 singly and in various combinations in accordance with the code in Fig. 16, the permutation bars 66 are provided with the cam lugs 66c (Fig. 3) which cooperate with the selecting bars 43, these bars being formed with beveled lugs 43b engaging lugs 66c (see Figs. 1 and 4, also). It is apparent that the rocking of the levers 43 in a counterclockwise direction (Fig. 1) will cause one or more of the permutation bars 66 to be cammed to the left (Figs. 2 and 3) and close the contacts PC1 to PC6 in various combinations depending upon the particular lever 43 operated. Thus, when the "A" key 37 is depressed, the top permutation bar and the second from the bottom (Fig. 2) or the extreme right-hand one and the second from the left (Figs. 1 and 4) will be actuated to close the contacs PC1 and PC6 representing the code combinations of holes in the "1" and "6" positions of the tape T. As will be seen later, this will cause the tape T to be perforated in the "1" and "6" positions by the perforating mechanism.

Pivotally mounted between the plates 60 is a short universal bar 69 (Figs. 2 and 3) which is disposed in the path of movement of all of the permutation bars 66. Also cooperating with universal bar 69 is a pin 70 which is slidably mounted in a bracket 70a fixed to one of plates 60 and has at its left-hand end an insulating pin engaging the common contacts CC. It is apparent that movement of any permutation bar 66 will cause the common contacts CC to be closed together with such of the contacts PC1 to PC6 as may be closed.

Figure 2:
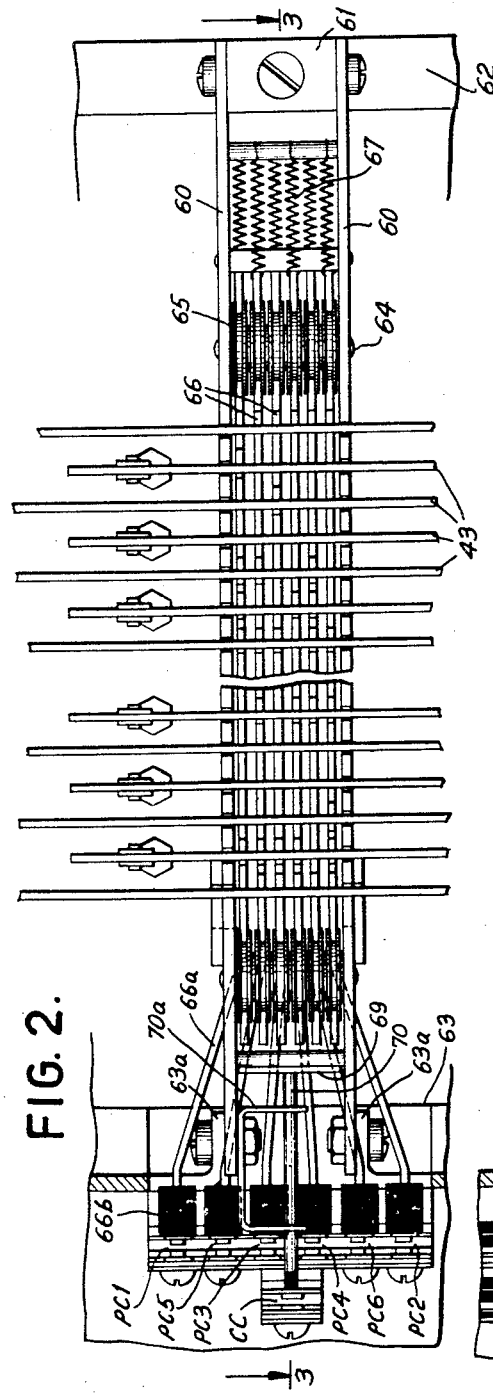
Fig. 2 is a bottom plan view on a large scale of the permutation bar mechanism in the typewriter.
Figure 3:
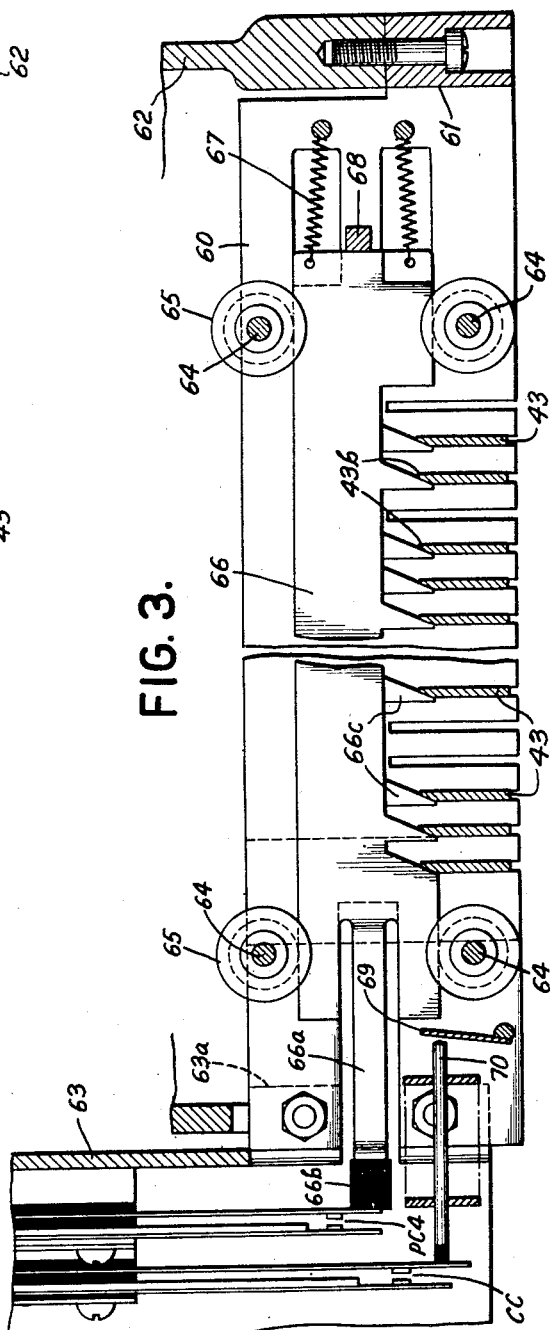
Fig. 3 is a vertical section on the line 3—3 in Fig. 2.

The shift cam unit 53 is provided with a link 42a (Fig. 4) and a permutation bar operating lever 71 having a wide lug 71a normally cooperating with the permutation bars 66 corresponding to the contacts PC2, PC3, PC4, and PC6 which, in Figs. 1, 2, and 4, are the four central bars 66. The lever 71 is formed with an open slot 71b (Fig. 4) which hooks over the rod 31a on which the levers 43 are pivoted and the top of the slot is formed with two similar shallow depressions. Coiled around the shaft 48 is a hair-pin spring 72 having its two downwardly projecting branches located on opposite sides of a pin 47a carried by one of the arms 47 and a pin 71b carried by the lever 71. With the type basket 20 in the lower case position as in Fig. 4, the pin 47a tensions spring 72 in a counterclockwise direction to hold the lever 71 in the position there shown, with the left-hand depression astride the rod 31a, the left-hand vertical wall of slot 71b acting as a stop to limit movement of lever 71 to the right.

If the shift key 54 is depressed, the cam unit 53 quickly draws upwardly on the link 42a (Fig. 4) and operates the lever 71 to cam the permutation bars 66 corresponding to the contacts PC3 to PC6 to the left (Figs. 2 and 3) to close these contacts and contacts CC. This corresponds to the code combinations in Fig. 16 identified as "Shift U. C." signifying "shift to upper case." As will be seen later, this causes the punch magnets corresponding to the "3" to "6"

code positions to be selected and punch the code so identified in Fig. 16 in the tape T.

The cam unit 53 completes its first half-cycle of operation to actuate the shift mechanism to shift the basket to upper case position and restores to the position of Fig. 4. However, the shifting of the type basket to upper case position causes the shaft 48 and arms 47 to rock clockwise thereby causing the pin 47a to engage the left-hand branch of spring 72 and tension the spring clockwise. Thus, when the cam unit 53 restores, the spring 72, by engagement of the right branch thereof with the pin 71b, will thrust the lever 71 to the left until the right-hand depression is astride the rod 31a.

When the shift key 54 is released, the cam unit 53 will operate a second time as usual to shift the type basket 20 back to its lower case position. Before this takes place, however, the lever 71 will be operated a second time and, in consequence of the fact that it has been shifted to the left, will cause the four permutation bars at the extreme left in Fig. 4 or the lower four in Fig. 2, to be actuated, thereby closing the contacts PC2, PC3, PC4, and PC6. As will be seen later, this will cause the code positions "2," "3," "4," and "6" to be punched as shown in Fig. 16 under the designation "Shift L. C." signifying "shaft to lower case."

The machine is provided with two shift keys like 54 of which the one shown in Fig. 4 is the one usually at the left-hand side of the keyboard and is provided with the usual shift lock key 73.

Contact means is provided to measure the extent to which a typed line is short of reaching the desired marginal position. This contact means is used to control the perforating mechanism to punch holes in the tape T which designate the number of spacing units which each typed line is short of the desired length. This measuring means comprises a dial switch which is shown in Figs. 1 and 15. Suitably mounted on a fixed part of the machine in the rear of the carriage 32 is an insulating plate 81 provided with an arcuate row of contact elements 82 with which coacts a contact wiper arm 83 secured to a gear 84. This gear 84 is rotatable on a stud 85 carried by the plate 81 and meshes with a rack 86 secured to a plate 87 fixed to a crossbar 88 carried by the carriage side plate 36. It is clear that the spacing of the carriage in a letter spacing direction causes the rack 86 to travel to the left (Fig. 15) and to rotate the contact arm 83 in a clockwise direction. The contact elements 82 are spaced angularly with reference to the stud 85 at intervals corresponding to one unit of spacing and there are 21 contacts 82. While the arm 83 rotates throughout the travel of the carriage, the arm is so positioned that, when the carriage is 21 units short of reaching the desired marginal position, the arm 83 will move onto the contact 82 at the extreme left in Fig. 15 and will arrive at the contact at the extreme right when the carriage arrives in the correct marginal position. That portion of the work sheet 21 units of spacing wide, and included between the two points just mentioned, will be termed the justifying zone and in typing the preliminary draft copy on the machine shown in Fig. 1, an effort will always be made by the typist to have each line terminate within the justifying zone so that the arm 83 will be resting on one of the contact elements 82 when the last character in the line is typed. Contact means are provided, as will be made clear hereinafter, whereby the arm 83 is made effective at the end of a line and the repeated traversing of the contacts 82 by the arm 83 during the course of writing a line of copy, has no effect on the electrical circuits.

In Figs. 10 to 13 inclusive, one of the stepping relays is shown. There are two of these relays of which the operating coils are designated SR1, SR2 in Fig. 14b. In Figs. 10 and 11, the second of these relays, actuated by the coil SR2, is shown as comprising a pressed metal framework generally designated 100 in which is rotatably mounted the ratchet wheel 101 having 28 teeth with which cooperates a feed dog 102 pivoted at 103a on the armature of magnet SR2. The armature 103 is pivoted on a bracket 104 secured to the yoke piece 105 of the magnet SR2 which yoke piece is suitably mounted in the frame 100. Thus the dog 102 in effect is universally pivotally mounted on the bracket 104 whereby it is capable of a certain degree of both vertical and lateral vibration. At its free end there is attached a spring 106 anchored to a pin carried by the frame 100. This spring 106 tends to pull the free end of the dog 102 downwardly and toward the right (Fig. 1) which end holds the dog in engagement with the tooth in a ratchet 101 and with the bottom wall of a slot 100a in frame 100. The armature 103 is provided with a spring 107 which, with spring 106, normally tends to hold the dog 102 away from the pole piece of the magnet SR2.

When the coil SR2 is energized, the free end of the dog 102 is raised and at the same time is drawn to the right (Fig. 11) by the spring 106 and caused to snap over the next succeeding tooth in a clockwise direction (Fig. 11). When the magnet SR2 is deenergized, the springs 106, 107 coact to impart one tooth space rotation to the ratchet wheel 101. The ratchet wheel 101 is provided with an aligning lever 108 urged in a clockwise direction by a spring 109 to engage a roller 108a on the lever 108 with a tooth space in the ratchet to align said ratchet in its successive positions. The relation of slot 100a to the dog 102 is such that dog 102 is prevented from moving further to the left or further downwardly than shown in Fig. 11 whereby any tendency of the ratchet 101 to over rotate due to momentum is prevented.

The ratchet wheel 101 is secured to a short shaft 109 (Figs. 10 to 12) which is rotatable in a bushing 110 riveted to the framework 100 and at the opposite end of the shaft is secured to the cams 111, 112. Fixed to the right-hand side of the cam 111 is a wiper contact 113 having the central finger 113a and the outer finger 113b. The cams 111, 112 actuate contacts designated SRC1, SRC2. The finger 113a engages a common contact button 114 mounted coaxially of the shaft 109 on an insulating plate 115 spaced from the framework 100 by suitable posts 116. The finger 113b coacts with one of a series of 28 contact buttons 117 arranged in the arc of a circle (Fig. 13) concentric with the button 114. Normally the finger 113b coacts with the button 117 designated "0" in Figs. 13 and 14b on which it is centered by the aligning lever 108. It is apparent that successive energization of the magnet SR2 will cause the ratchet wheel 101 and consequently the finger 113b and cams 111, 112 to be stepped in a counterclockwise direction.

The stepping relay SR1 is similarly constructed except that that it has a 45 tooth ratchet and is provided only with cams 111a, 112a (Fig. 12a) actuating contacts designated SRC3, SRC4.

Cams 111, 112 make one full revolution and cams 111a, 112a one-third of a revolution per line of copy in a manner to be explained hereinafter.

The cam 111, as shown in Fig. 12, is provided with a short one-tooth dwell positioned so that the contacts SRC1 are normally open and closed with the first step of movement of the ratchet 101. The cam 112 has a high point for approximately six teeth on the actuating ratchet and is positioned so that the contacts SRC2 are normally closed and opened with the first step of movement of the ratchet 101. After 22 steps of movement of the ratchet 101, the contacts SRC2 are reclosed. The cam 111a has three short dwells at intervals of 15 teeth and is normally in a position with the contacts SRC3 open but these contacts are closed with the first tooth space of movement of the ratchet actuated by the magnet SR1. The cam 112a has three short high points at intervals of 15 teeth and is so positioned that the contacts SRC4 are normally closed but opened with the first step of movement of the ratchet and reclose with each fifteenth step of movement. Thus, it is necessary for the cams 111a, 112a to rotate only a third of a revolution for each full revolution of the cams 111, 112. This makes it possible to use similar relays and avoids the use of a ratchet wheel for relay SR1 which has coarse teeth. It will be understood, however, that any relay of similar construction may be used for that purpose.

The machine is equipped with two space bars designated SB1, SB2 which cause the carriage to be spaced two and three units of spacing, respectively. These space bars are attached to key levers designated SB1, SB2 in Fig. 20 which control cam units 125, 126 (Fig. 20) similar to the cam units 29 which actuate the type bars. The cam unit 125 is provided with an extension 125a cooperating with the contacts WSC1, WSC2 (Fig. 1) so as to close said contacts whenever the cam unit 125 is rendered operative by the two units space bar SB1. Cam units 125, 126 are connected by links 127, 128 (Fig. 20) to two similar levers 129, 130 pivoted on the rod 26. The cam units 125, 126 are located at opposite ends of the power roller 30 and the levers 129, 130 corresponding thereto are connected by links 129a, 130a to arms 131 secured to shafts 132 journaled in the framework. The shaft 131, 132 abut near the center of the machine at which point they are separately provided with arms 133 located side by side.

Pivoted to the foremost of the arms 133 in Fig. 20 is a slide 134, while a second slide 135 is pivoted to the rear arm 133. The slides 134, 135 are supported and guided by suitable slots thereon through which passes a shouldered stud 136 carried by the framework of the machine. The slide 134 has an extension 134a which projects upwardly and to the rear of the dog 137 pivoted for vertical movement on the dog rocker plate 138 of the escapement mechanism which causes three units of spacing when rocked horizontally as described in Patent No. 2,224,766. The central link 41 in Fig. 1 is pivoted at its upper end to dog 137 and may be pulled down to couple dog 137 to the slide 39, as in said patent, for the purpose of operating the three-unit escapement when characters are printed. The slide 135 has a similar extension 135a behind the dog 139 for the dog rocker plate 140 of the two-unit escapement. The extensions 135a are so shaped that they do not interfere with drawing of the dogs 137, 139 downwardly in selecting an escapement for operation when characters are printed.

When the two-unit space bar SB1 is depressed by the typist, the cam unit 125 is rendered operative and, besides closing the contacts WSC1, WSC2, rocks clockwise the arm 129 thereby, through links 129a, similarly rocking the rearmost of the arms 131, 133 and the corresponding shaft in the same direction. This draws the slide 135 to the right (Fig. 20) and, through the extension 135a, actuates the dog 139 to the right thereby operating the two-unit escapement mechanism which will cause the carriage to be spaced two units. In a similar fashion depression of the three-unit space bar SB2 will cause the slide 134 to be drawn to the right and operate the three-unit escapement by means of the extension 134a and the dog 137.

The carriage return key CRK (Fig. 1) is provided with a solenoid CRS termed the carriage return solenoid which may be energized in a manner hereinafter made clear to depress the carriage return key CRK and cause a carriage return operation by means of the power carriage return mechanism with which the typewriter is customarily provided. The cam unit which is controlled by the carriage return key CRK also is provided with an extension similar to the extension 125a in Fig. 1 which actuates a similar pair of contacts designated CRC1, CRC2, in Fig. 14A to close said contacts whenever the carriage return cam unit is operated by the power roller.

The cam unit 126, controlled by the three-unit space bar SB2, operates the permutation bar mechanism through a lever similar to levers 43 but the carriage return cam unit does not operate the permutation bar mechanism. As will be seen hereinafter, the punching of the code perforations for carriage return, line space, and two-unit space is under the control of the contacts CRC2, WSC2, and by other means.

*Tape perforating unit*

The perforating apparatus is shown in Figs. 5 to 9 and includes the punches 210 (Fig. 6) one for each of the six code positions, and a die 211. The punches 210 are slidable in a punch guide block 212, and are normally held in retracted positions by means of individual springs 213 anchored to a bracket 214 secured to an upright front frame plate 215 (see Fig. 5 also). The punch guide block 212 and die 211 are also secured to the plate 215.

Each punch 210 is provided with a recess 210a (Fig. 6), into which recess is received one end of a punch actuating lever 217 having a central oval opening 218. An individual punch lever 217 is provided for each punch 210. An elongated cam or eccentric 219 is carried by or, if desired, formed on a main shaft 220 which is suitably journaled in the front plate 215 and the central frame plate 221 (Fig. 5). The eccentric 219 is disposed within the oval openings in the individual punch operating levers 217 to support and oscillate the said levers.

Suitably disposed stop rods 222, 223 (Figs. 5 and 6) are provided to maintain proper alignment of the punch levers with punches 210. In order to space the punch levers 217 properly, suitable spacing washers 224, 225 are provided on rod 222 and eccentric 219, respectively, between the punch levers 217. In addition, the right-hand ends of the punch levers extend into slots formed in a guide comb 226 secured to front plate 215.

Normally, during the rotation of the eccentric 219, the punch levers are oscillated (Fig. 6) about the pivoted connections formed by the ends of the punch levers in the recesses or slots 216 in the related punches 210.

Individual, suitably spaced cruciform latch levers 227 are provided (Fig. 6), one for each punch lever 217, the latch levers being pivotally mounted on a stud 228. The levers 227 have the depending arms 227a and upright arms 227c loosely fitted into individual slots in guide combs 226 and 229, respectively, the latter also being suitably secured to plate 215. Near the extremity of each arm 227a, a latching shoulder 230 is provided which is disposed in alignment with, but normally held disengaged from, the end of one of the punch levers, by means of related latching armatures 231 of one of the punch selecting magnets PM1 to PM6. Each armature 231 is provided with a shouldered recess 233 which receives the tip of arm 227d of the related latch lever 227 to latch the latter and hold the arm 227a out of the path of the free end of the related punch lever.

The energization of each of magnets 232 causes the related armature 231 to be attracted releasing the coacting arm 227d and permitting the related latch lever 227 to be swung in a clockwise direction (Fig. 6) under influence of a spring 234, thereby positioning the shoulder 230 of arm 227a underneath the end of the related punch lever 217.

It should be mentioned at this time, that, in the present embodiment of the invention, the shaft 220 carrying the eccentric 219, is operated in a start-stop manner, and accordingly, provision is made whereby the latch levers 227 are moved to a position to latch the desired punch levers 217 at the start of each cycle, before the rotated eccentric 219 oscillates the punch levers. Thus, upon selective release of a latch lever 227 and subsequent rotation of the eccentric 219, the corresponding punch lever 217 is rocked counterclockwise by the eccentric (Fig. 6) about the pivotal connection formed by the shoulder 230 on the arm 227a of the selected latch lever 227 and the right-hand end of the punch lever, to force the related punch element 210 downwardly, thereby causing the record medium, such as a tape T, interposed between the guide block 212 and die 211, to be perforated.

Locking means are provided for holding the latch levers 227 in released position and for preventing release of unreleased latch levers during the rotation of the eccentric 219. This means comprises a locking bail 238 (Fig. 6) which is common to all latch levers 227, and which includes an arm 239 fixed to shaft 240. Shaft 240 is rotatably mounted in the plates 215 and 221 and has fixed thereto a spring urged cam follower arm 241 (Figs. 5, 7, and 18) cooperating with a cam 242 secured to the main shaft 220. Cam 242 is so shaped that normally, with the shaft 220 at rest, as in Fig. 6, the locking bail 238 is held out of the path of the end of arm 227a of each latch lever 227.

Early in the rotation of shaft 220, the follower arm 241 moves from the high portion of the cam 242 into the dwell to permit the locking bail 238 to be raised (Fig. 6) and engage the ends of arms 227a of the latch levers 227 and lock them in either normal or released position. The raised position of locking bail 238 is maintained until the tape T has been perforated, whereupon the high portion of cam 242 again engages the cam follower arm 241 to restore the 238 bail to the position of Fig. 6. The perforating unit is provided with a restoring bail 243 (Fig. 6) which includes an arm 244 fixed to a shaft 245 journaled in the said plates 215 and 221. The shaft 245 has fixed thereto a spring urged cam follower arm 246 (Fig. 7) cooperating with a cam 247 secured to shaft 220. The cam 247 is effective, during each cycle of rotation of shaft 220, to partially rotate the follower arm 246 and shaft 245 in a counterclockwise direction (Fig. 7) to cause the bail 243 to positively rock the latch levers 227 counterclockwise (Fig. 6) back to the normal latched position out of the path of the ends of the punch levers 217. As soon as the latched punch levers 217 are released, the punches 210 may be withdrawn from the perforated tape T by the springs 213, the punch levers 217 rotating on the eccentric 219 as a pivot. It is evident that, to positively withdraw the punches from the tape T by means of the eccentric, it is merely necessary to prolong the period during which the punch levers 217 are held in latched position by levers 227 and delay the period in the cycle during which the bail 243 is operated to restore the levers 227 to the position of Fig. 6.

Means is provided for positively restoring the armatures 231 of magnets PM1 to PM6 to the normal position, shown in Fig. 6, at about the time bail 243 is operated to restore the latch levers 227. This means includes a bail 250 (Figs. 6 and 9) which is common to all of the armatures 231 and is formed as an offset part of an arm 251 secured to shaft 252, the latter being journaled in plates 215 and 221. Shaft 252 has fixed thereto a spring urged cam follower arm 253 (Fig. 7) cooperating with a cam 254 secured to shaft 220. This cam is effective, at about the same time cam 247 operates bail 243, to force bail 250 in a counterclockwise direction (Fig. 6) to move any of the attracted armatures 231 back to the normal position, to engage and relatch the released arms 227d of the latch levers 227.

Suitable means for intermittently advancing the tape T is provided which is operated near the end of each cycle of rotation of the shaft 220. The tape T is drawn from a suitable supply roll 255 (Fig. 6) on a reel 256 loosely mounted on a vertical stud 256a carried by plate 221. From the supply roll 255 the tape passes around a vertical roller 256b supported by the main framework and then extends forwardly to a guide plate 257. This guide plate is secured to the front plate 215 and has a substantially flat tape guiding surface. At the top the guide plate 257 is formed with a 45° guide surface 257a over which the tape T passes to make a 90° bend downwardly over the left-hand surface of the plate 257, the latter having a guide lug 257b. The plate 257 also has an opening (not shown) registering with a lug 258a in a tape feeler lever 258 and normally the tape passes between the lug 258a and the left-hand surface of the plate 257. This prevents the lever 258 from rocking clockwise under the tension of a spring 258b, it being understood that the tape T is normally under a certain degree of tension. From the plate 257, the tape T passes downwardly over a guide roller 259 and turns to the left past a tape guide lever 260 located just to the right of the punches 216. From the tape guide member 260, the tape T passes to the left between the die 211 and punch guide block 212, over a sprocket wheel 261, and under a guide post 262 to the reel 263. The sprocket wheel 261 is provided with centrally located and equally spaced sprocket teeth 264 engaging the centrally located feed perforations 202 (Figs. 5 and 16) in the tape T. The usual arcuately shaped guide 266 is provided to hold the tape T against the sprocket wheel.

Sprocket wheel 261 is fixed to shaft 267 (Figs. 5 and 6) journaled in plates 215 and 221. The shaft 267 has secured thereto a ratchet wheel 268 (Fig. 7), which is rotated step-by-step by a spring urged cooperating pawl 269 pivoted on a cam follower arm 270. The latter is pivotally mounted on a plate 215 and urged against a cam 271 by spring 272. Near the end of each cycle of shaft 220, the high point of cam 271 moves the cam follower arm 270 and pawl 269 to the left, or clockwise, as viewed in Fig. 7, to advance the ratchet wheel 268 and the sprocket wheel 261 one tooth space.

A fixed plate 273 (Fig. 7) secured to plate 215 is provided with a cam surface 274 which is engaged by the end of pawl 269 to prevent an overthrow of the ratchet wheel 268. The usual spring urged detent arm 275 is provided and cooperates with a detent wheel 276 fixed to shaft 267 for maintaining the said shaft 267, ratchet wheel 268 and sprocket wheel 261 in the advanced position.

In order to facilitate tape insertion and removal operations, the tape guide 266 (Figs. 5 and 6) is secured to one arm of a lever 277 pivotally mounted on plate 215, which arm is pivotally connected to one end of link 227a. The other end of link 227a is joined by a pin and slot connection to the pivotally mounted and spring urged tape guide member 260. Thus, whenever the guide 266 is manually moved away from sprocket 267, the guide member 260 is also partially rotated in a counterclockwise direction by lever 277 and link 277a (Fig. 6), so that the tape may be easily inserted.

The operation of the mechanism so far described will now be reviewed.

At the start of each cycle of rotation of shaft 220, the latch levers 227 will have been selectively released in any desired combination by selective energization of the related magnets PM1 to PM6 (Fig. 6) to latch the free ends of the related punch levers 217. Next, the locking bail 238 is operated by cam 247 to engage and lock the displaced latch levers 227 in a latched position and to prevent release of the remaining latch levers during this cycle.

Eccentric 219 is then effective to oscillate the latched levers 217, causing the connected punches 210 to be operated to perforate the tape T, in accordance with the selected code combination, while the tape is at rest at the punching station, the code being shown in Fig. 16. After the punching operation, the locking bail 238 is restored to its normal position and the bails 243 and 250 are rendered operative to restore the latch levers 227 and armatures 231, respectively, to their normal positions, thereby releasing the latched ends of the operated punch levers 217 and permitting the punches to be withdrawn from the tape. The tape feeding mechanism is then rendered operative, near the end of the cycle, to advance the tape one step, thus presenting a fresh portion of the tape to the punches.

The centrally located feed perforations 202 are not originally provided in the tape T but are made during each punching operation. For this purpose a special latch lever 278 (Fig. 5) is provided, which is similar to levers 227 but locking arm 227d and pivotally mounted on stud shaft 228 in related slots in the guide combs 226 and 229. The reset bail 243 is provided with a recess opposite lever 278 so that, during the resetting of latch levers 227, the said special latch lever 278 is not engaged by said bail and accordingly no release of the associated punch lever 217 is effected during the resetting operations and, after perforation of the tape, the associated punch element is positively withdrawn from the tape under the influence of the eccentric 219. Since the punch lever 217 is always latched, a pivotal connection is formed at the end of the punch lever latched by lever 278 by the shoulder 238 in lever 278 and the stop 223 thereby enabling the eccentric to positively restore the feed hole punch to its normal retracted position.

In order to control the start-stop operations of shaft 220, a well known type of magnetically controlled, one-revolution clutch means is provided, such as the one disclosed in Patent 2,206,646. Accordingly, only a brief description will be given herein. This clutch means comprises an annular member 290 (Figs. 5 and 8) which is secured to shaft 220. A slidable and spring urged clutch dog 291 is disposed in a suitable transverse channel formed in the annular member 290, and the dog is provided with a single tooth 292. A dog operating lever 293 is pivotally mounted in the annular member 290 and is disposed in a suitable transverse channel formed in the dog 291. The free end of the dog operating lever 293 extends beyond the periphery of the annular member 290 and normally engages a stop lug 294 formed on the lever 295 secured to stub shaft 295a. Lever 295 is urged counterclockwise by a spring (Fig. 8) 296 so that the stop 294 normally is held in the path of the lever 293. When the parts of the clutch are in this position, the stop lug 294 and lever 293 are effective to hold the dog 291 out of engagement with the interval teeth 297a of a ratchet wheel 297 secured to the shaft 298 aligned with shaft 220.

Secured to or forming part of the lever 295 (Fig. 8) is an armature 299 cooperating with a clutch magnet PCM. Momentary energization of punch clutch magnet PCM withdraws the stop lug 294 of lever 295 out of the path of the dog operating lever 293, thereby releasing the latter and enabling the spring operating dog 291 to move the latter so that its tooth 292 engages the teeth 297a of ratchet wheel 297. Shaft 298 is constantly rotated by means of the punch motor PM through a suitable worm drive 302.

Upon completion of each cycle of rotation of shaft 220, the dog operating lever 293 reengages the stop 294 to disconnect the tooth 292 of the dog member from the continually rotating ratchet wheel 297, thus preventing further rotation of this shaft.

Means are provided for locking the clutch in starting position and comprises a spring-urged back-lash dog comprising an arm 303 (Fig. 8) loose on shaft 295a and urged by a spring 303a into cooperation with a suitable notch 304 formed in a cam 305 fixed to shaft 220. The lever 295 is provided with a rotatably adjustable stop stud 303b extending into the plane of the back-lash dog 303.

When the punch clutch magnet PCM is energized to release the clutch dog 291 as described above and the ratchet 297 is coupled for driving purposes to the shaft 220, the cam 305 rotates clockwise and slightly rocks the back-lash dog 303 in a counterclockwise direction (Fig. 8) into engagement with stud 303b which in the meantime will have been moved slightly clockwise to meet the dog 303 due to the energization of magnet PCM. After the shaft 220 has rotated approximately one-third of a revolution, the high point of the cam 305 starts to rock the dog 303 and also the lever 395 clockwise a further extent to force the stop lug 294 into the path of the end of lever 293 in which position the lug 294 remains until the end of the cycle at which time the lever 293 will be rotated to withdraw the tooth 292 from engagement with ratchet 291. At about the time the tooth is fully disengaged, the end of pawl 303 will snap back into the notch 304 and prevent backward rotation of the shaft 220. The back-lash pawl 303 and the lug 204 cooperate in the position of Fig. 8 to prevent rotation of the shaft 220 in either direction. Thus the shaft 220 is always started and stopped at a definite position.

A pivoted bail 312 (Fig. 6) is provided which is common to the arms 227c of latch levers 227 and includes the arms 313 pivotally mounted on stud 314. One of the arms 313 is provided with an extension 315 carrying a roller 316 of insulating material engaging one of a pair of contacts BC. When any latch lever 227 is released, the bail is rotated in a counterclockwise direction to close the contacts BC.

The perforating mechanism is equipped with certain cam operated contacts which are designated C1 to C4 in Figs. 5, 7, 17, and 14A. The contacts C1 and C2 are of the type known as transfer contacts and are operated by a common cam 309a (Figs. 5 and 7) which is timed to close the contacts C2 and open the contacts C1 at approximately 30° in the punch cycle and to reclose the contacts C1 and reopen contacts C2 at about 285° of the punch cycle. The contacts C3 are operated by a cam 309b and are timed to close at approximately 10° of each cycle and open at about 175°. The contacts C4 are operated by a cam 298a on shaft 298 and are closed momentarily once for each revolution of the shaft 298 which, it will be recalled, rotates continually.

Safety contacts are provided which are controlled both by failure of the tape to feed to the punch station and by excessive tension in the tape. A contact operating arm 318 is secured to a shaft 319 (Figs. 5 and 6) journaled in plates 215 and 221, which arm is constantly urged in a counterclockwise direction (Fig. 6) by one of the spring blades of feed interlock contacts FIC. Also secured to shaft 319 is a lever 320 having the oppositely directed pins 321. The lever 258 is pivotally mounted on shaft 319 and its lug 258a, which normally rides on the tape T, prevents actuation of the lever 258 against one of the pins 321 by the spring 258b. However, upon exhaustion of the tape, the lever 258 is rotated sufficiently in a clockwise direction by spring 258b to engage and partially rotate the lever 320 thereby operating arm 318 to open the contacts FIC. A tape tension arm 322 carrying the roller 259 is also rotatably mounted on shaft 319, which arm 318 is urged in a counterclockwise direction by spring 324.

In the event the tape T becomes too taut, its tension is effective to cause the arm 322 to be partially rotated in a clockwise direction (Fig. 6) to engage the left-hand pin 321 on the lever 320, rotating the latter and operating arm 318 to open the feed interlock contacts FIC. The purpose of these contacts will be clear as the description progresses.

The operation of the machine as a whole will now be described with reference to the wiring diagram (Figs. 14A and 14B).

It will be assumed that the tape T has been inserted in the perforating mechanism as described above, that a work sheet has been inserted around the platen of the typewriter and that the carriage is in starting position ready to type the first line of the preliminary copy of the material which is to be subsequently automatically justified in the machine provided for that purpose. This machine is disclosed in a copending application, Serial No. 636,525, filed December 21, 1945, by Ronald D. Dodge. The switches S1, S2 are closed thereby starting the typewriter motor TM and the punch motor PM, placing the system in readiness for typing the first line and punching the first section of tape corresponding to the first line. It will also be assumed that the machine is equipped with a suitable justification indicator, such as, for example, the one disclosed in Patent 2,217,160 and that when the scale reads zero the wiper blade 83 (Fig. 15) will rest on the 21st or extreme right-hand contact element 82 (Fig. 15). The wiper 83 will assume various positions in a counterclockwise direction (Fig. 15) according to the extent the line is short, and the number of holes punched in the tape T to indicate the shortage of the line as described hereinafter will depend upon the position of the wiper 83 in a counterclockwise direction in relation to the contact 82 marked 21.

The first step which the operator takes before actually writing the first line is to depress the starting key SK (Fig. 14A) which will close contacts SKC and establish a circuit from the positive direct current line wire W10 leading from the rectifier R (Fig. 14B), the contacts SKC (Fig. 14A), thence over the wire W3 and through the coil of relay R1, to the negative line wire W9. The relay R1 closes the contacts R1A to R1C (Fig. 14B).

The relay R6 now will be energized in parallel with the relay R1 by the closure of the contacts R1A (Fig. 14B) over the wire W28 to line wire W9. Relay R6 thereupon closes its contacts R6A to R6D. The closure of contacts R1B, R6D establishes a circuit from the line wire W10 (Fig. 14B), through the contacts R1B and wire W29, through the coil of relay R8 and contacts R6D, to line wire W9. Relay R9 is energized by a circuit from line wire W10 (Fig. 14B), contacts R6D, wire W11, and coil of relay R9, to line wire W9, and opens contacts R9A. The closure of the contacts R6B (Fig. 14B) completes a circuit from the line wire W10, through the contacts R6B to wire W15, the feed interlock contacts FIC (Fig. 14A), and the clutch magnet PCM, to line wire W9. The energization of the clutch magnet PCM starts a cycle of the perforating mechanism as explained above. On account of the method of operating the central punch which makes the feed perforations, this punch will be operative to punch a feed hole 202 in the tape and the tape T will be advanced one step.

During the cycle in which the first tape feed perforation is made, the contacts C3 close and connect wire W11 to wire W16. This enables a branch circuit to be established from line wire W10 (Fig. 14B), through the contacts R6B, contacts C3, and line wire W11, W16; and through the coil of stepping relay SR2, to line wire W9. The energization of the coil SR2 causes the stepping relay to be advanced one step. The first step of movement of the relay SR2 causes the cam 111 (Fig. 14B) to close the contacts SRC1. This establishes a holding circuit for the relay R6 which extends from line wire W10 (Fig. 14B), through the contacts SRC1, wire W27, contacts R6A, and relay R6, to line wire W9. The contacts R6B are thus kept closed with the result that the perforating mechanism continues to operate as long as relay R6 is held energized. This in turn causes the relay SR2 to receive a succession of pulses, as traced above, one for each operating cycle of the perforating mechanism during which a feed perforation is punched.

Thus, the wiper 113 of the relay SR2 will be progressively advanced one step for each feed perforation 202 until eventually the wiper 113 arrives at the contacts 117 numbered 22 in Fig. 14B. This closes a circuit from the line wire W10, (Fig. 14B), the wiper 113, the 22nd contact element 117 of the stepping relay, wire W21, and the punch magnet PM4 (Fig. 14A), to the line wire W9. Thus, after the wiper 113 engages the 22nd contact 117, a hole will be perforated in the tape in the "4" position as shown at the left (Fig. 19) which, with reference to Fig. 16, it will be seen corresponds to a carriage return operation.

So far the perforating mechanism has punched a succession of 23 feed perforations in the tape followed by the 24th feed perforation accompanied by a carriage return perforation. During the cycle in which the 24th feed perforation and the carriage return perforation is made, the contacts C3 close a circuit to the stepping relay SR1 as before and steps the wiper 113 to the 24th contact 117 of the stepping relay. After the carriage return perforation and the 24th feed perforation corresponding thereto are punched in the tape T, the relay R6 remains energized, being held through the contacts SRC1, whereby the relay SR2 continues to receive impulses from the contacts C3, a further succession of feed perforations being made in the tape until relay SR2 has advanced to the zero position.

When the wiper 113 reaches the 26th contact 117, a circuit is established from the line wire W10 (Fig. 14B), through the wiper 113, wire W14, and carriage return solenoid CRS, to line wire W9, thereby initiating a carriage return operation which will cause the carriage to be returned in the event that the operator has failed to do this as a preliminary to starting operations. The contacts CRC1, CRC2 close but, owing to the fact that relay R9 is still energized holding contacts R9A open, no circuit can be established through the contacts CRC2 to the punch magnet PM3 and the perforating of a line space code representation is thus prevented.

During each cycle of operation of the perforating mechanism, the contacts C1 open and C2 close to energize the relay PR1 across the line wires W9, W10 thereby closing the contacts R1A and establishing a holding circuit for the relay PR1 traced from line wire W10 (Fig. 14A), the contacts CRC1, wire W13, contacts PR1A, and coil PR1, to line wire W9. This circuit is held until the carriage return mechanism has completed its cycle of operations reopening contacts CRC1, CRC2.

At the same time the wiper 113 moves onto the zero contact 117, the contacts SRC1 (Fig. 14B) open and deenergize the relay R6. The opening of the contacts R6B deenergizes magnet PCM and prevents further energization of the stepping relay SR1 by means of the contacts C3 and the perforating mechanism stops.

While the relay SR2 is being advanced as just described, the relay SR1 will also be advanced provided it has not been restored to the zero or starting position. The circuit for relay SR1 extends in parallel with relay SR2 from line wire W10, through the contacts R7A, and the coil of relay SR1, to line wire W9. If the stepping relay SR1 is standing at zero, in which position contacts SRC3 are open, the relay R7 will be in deenergized condition when the key SK is operated. If the relay SR1 is not in zero position, the contacts SRC3 will be closed and this allows the closure of contacts R6D to energize the relay R7 and close contacts R7A. The circuit for relay R7 extends from line wire W10 (Fig. 14B) through contacts SRC3, wire W28, the coil of relay R7, and contacts R6D, to line wire W9. However, when the relay SR1 reaches zero position, the contacts SRC3 open and, by deenergizing relay R7, interrupts the circuit which pulses relay SR1. Since the cam 111a of relay SR1 has its dwells at fifteen-tooth intervals, only fourteen steps of movement at the most are required to restore the relay SR1 to zero. The relay SR2 also always will be actuated forwardly to zero, notwithstanding the fact that it may not be in zero position when the key SK is depressed. The relay R1 is kept energized in parallel with relay R6 by the joint cooperation of the contacts R6A and R1A; consequently, relay R1 is deenergized at the same time as relay R6.

The machine is now in readiness to type the first line of the preliminary draft and concurrently therewith perforates the tape T to represent the characters and spaces involved in writing the line. Most commonly the first line will be indented for which purpose the three-unit space bar SB2 will be used and each time this space bar is operated, the tape will be perforated with code representation identified in Fig. 16 at the left as "3 unit SP." The typewriter carriage will be spaced in multiples of three units according to the degree of indentation desired as determined by the number of times the space bar SB2 is operated. The mechanism, by means of which the variable spacing mechanism of the typewriter is operated to produce three units of spacing per space bar operation, has already been described above and need not be repeated at this point. It remains, however, to trace the circuits which are closed upon depression of the space bar SB2 to select those punch magnets which punch the three-unit space code, consisting of perforations in the "1" and "2" positions on the tape (Fig. 16).

These circuits are closed when the operation of the three-unit space cam unit shifts the permutation bars to close the contacts PC1, PC2. The closure of the contacts PC1, PC2 occurs concurrently with the closure of the contacts CC and establishes circuits through the punch magnets PM1, PM2. The first circuit to be traced is the circuit to the punch magnet PM1 which is controlled by the punch contacts PC1. This circuit starts from the line wire W10 (Fig. 14A) and passes through contacts C1, which are closed when the perforating mechanism is stopped; the contacts PR1B, the wire W17, contacts R9A (Fig. 14B), wire W18, the common contacts CC (Fig. 14A), permutation contacts PC1, wire W24, and punch magnet PM1, to line wire W9. A similar circuit over wires W17, W18, W23 is established by the contacts PC2. The concurrent energization of the magnets PM1 and PM2 will cause the bail contacts BC to close in the manner described above and established a circuit from the wire W10 through the contacts C1, PR1B, contacts BC, F1C, and magnet PCM, to line wire W9. The energization of the clutch magnet PCM causes a cycle of the perforating mechanism to punch holes in the "1" and "2" positions on the tape T and the punch will stop. This will be repeated as many times as the three-unit space bar is operated. It will be assumed that three units are sufficient indentation; consequently, Fig. 19 shows only a single three-unit code combination at the left, just to the right of the first carriage return hole.

The next operation is to shift the type basket 20 to the upper case position and punch a shift code representation prior to the operation of a character key to print the initial letter of the first line. The shift key 54 is depressed thereby rendering the cam unit 53 operative to actuate the type basket to upper case position at the same time the lever 71 is actuated and causes the permutation bars 66 corresponding to the "3," "4," "5," and "6" positions of the tape to close the contacts PC3, PC4, PC5, and PC6.

The closure of the foregoing contacts establishes circuits through the magnets PM3 to PM6 in exactly the same fashion as described above with respect to the punching of the three-unit space code, all of the magnets being energized in parallel through the contacts C1, PR1B, and PC3 to PC6. This causes another operation of the perforating mechanism by energizing the clutch magnet PCM through the closure of the bail contacts BC, as before with the result that the tape is punched with the code representation 3456.

The cam unit restores after shifting the type basket but the key 54 is held depressed by the typist. When the cam unit 53 restores, the lever 71 is restored and, in consequence of the tension created in the spring 72 by the shifting of the type basket 20, the lever 71 is snapped to the left (Fig. 4) to place the lug 71a in register with the permutation bars corresponding to code positions 2, 3, 4, and 6. While still holding the shift key depressed, the operator next depresses the desired character key 27 ("T," Fig. 19) for the initial letter of the first word. The depression of this key will cause the cam unit 29 associated with that key to print the desired character, select the desired spacing of the carriage through the variable spacing mechanism, and, finally close the desired ones of the contacts PC1 to PC6 and select magnets PM1 to PM6 according to the code representations of the first character printed.

The shift key 54 is now released, allowing the cam unit 53 to operate a second time in the well known way, thereby actuating the lever 71 and shifting the permutation bars 66 to close the contacts PC2, PC3, PC4, and PC6. At the same time, the type basket 20 is shifted back to the lower case position in a well known way. The operation of the contacts PC2, PC3, PC4, and PC6 energizes the corresponding magnets PM2, PM3, PM4, and PM6, and causes the bail contacts BC to close and initiate another cycle of the punching mechanism to punch the code representations 2, 3, 4, and 6 in the tape T. The tracing of the circuits for the punch magnets selected is the same as above for the magnets PM1, PM2.

The operator now proceeds to type the remaining characters of the first word, which of course, will cause the perforating mechanism to function in the same way as before, to punch the desired code representations of the characters on successive portions of the tape T. After all of the characters of the first word have been typed and punched in the tape, it is necessary to effect a spacing operation prior to writing the next word or character. For spacing between words, the operator uses the two-unit space bar SB1 which has two separate effects. The first of these effects is the punching of the two-unit space code representation consisting of a single hole in the "6" position of the tape over a circuit which is traced similarly to those for the other punch magnets. The second effect of the depression of the space bar is to cause the stepping relay SR1 to advance the cams 111a, 112a one unit. The manner in which this is done will now be made clear.

The operation of the cam unit 125 associated with the two-unit space bar SB1 causes the word space contacts WSC1, WSC2 (Figs. 1 and 14A), to close and the carriage will be spaced two units. The closure of the contacts WSC1 establishes a circuit as follows: line wire W9, the coil of the relay SR1 (Fig. 14B), wire W6, contacts WSC1 (Fig. 14A), line wire W7, and contacts SRC4 (Fig. 14B), to line wire W10. This causes the relay SR1 to advance one step thereby closing the contacts SRC3. The first step of movement of the relay SR2 causes the contacts SRC4 to open. The circuit through coil SR1 is broken immediately upon the restoration of the cam unit 125 associated with the two-unit word space bar SB1, with the result that, for each operation of the two-unit space bar, the relay SR1 is advanced one unit.

The operator finishes writing the line during which the machine functions to punch the tape with representations of either the characters or spaces, as the case may be, until the last character in the line is typed, the operator making sure that the last character is typed within the zone of 21 units of spacing to the left of the right-hand marginal point on the work sheet. As the carriage moves into this zone the wiper 83 will be rotated an extent proportional to the encroachment of the end of the line into the justifying zone, as it may be called. The machine is now ready to punch the holes in the tape which determine the amount of justification when the tape subsequently is used in the automatic justifier system.

The relay SR1 has a capacity of fourteen word spaces and the tape will be perforated with one perforation in the "5" position of the tape T for each tooth space the relay SR1 must be advanced from its stopping position at the termination of writing a line to bring the relay back to the zero position. Also a hole will be punched in the "2" position of the tape T for each of the number of steps which the relay SR2 must be advanced to bring the wiper 113 into coincidence with the setting of the wiper 83. For example, if the type line terminates with the wiper 83 resting on the 4th contact 82 (Figs. 14B and 15), the relay SR2 must be stepped forward four tooth spaces and, for each of these steps of the wiper 113, a hole will be punched in the "2" position of the tape T.

In order to cause the foregoing perforations to be punched in the tape, the justification key JK is depressed, after typing the last character of a line, closing a circuit as follows: line wire W10, contacts JKC (Fig. 14A), wire W8, and relay R5P (Fig. 14B) to line wire W9. The relay R5P—R5H closes its contacts R5A and establishes a holding circiut for the coil R5H (Fig. 14B) of the relay R5P—R5H as follows: line wire W10, contacts SRC2, R5A; and the coil R5H, to line wire W9. The contacts R5B also close and connect the line wire W10 to the wire W28 thereby energizing relay R6 which closes all of its contacts R6A to R6D, inclusive.

The closure of one set of the contacts R6B causes the energization of the punch clutch magnet PCM in the same manner as previously described when the start key SK was depressed, causing the perforating mechanism to operate one cycle to punch a feed perforation in the tape. The closure of one set of the contacts R6D also causes the relay R7 to be energized over a circuit from line wire W10 (Fig. 14B), contacts SRC3, the coil of relay R7, and contacts R6D, to line wire W9. During the first punch cycle, the contacts C3 close, establishing a circuit from the line wire W10, through the contacts R6B (Fig. 14B), wire W11, contacts C3 (Fig. 14A), wire W16, and relay SR2, to line wire W9, whereby the relay SR2 is advanced one step. A parallel circuit is established from wire W16, through the contacts R7A of relay R7, and the coil of relay SR1, to the line wire W9, whereby the relay SR1 is advanced a step.

The advancing of relay SR2 one step causes the contacts SRC1 to close and the contacts SRC2 to open. The closing of contacts SRC1 establishes a holding circuit for relay R6 from line wire W10 through the contacts R6A and coil R6 to line wire W9. The opening of contacts SRC2 with the first step of movement of relay SR1 breaks the holding circuit for relay R5P—R5H allowing said relay to deenergize. The holding circuit for relay R6 permits release of the justification key JK and causes the repeated impulsing of the relays SR1, SR2 for the number of cycles necessary to punch the required number of justification holes in the tape.

The punch magnets PM2 and PM5 are selected by simultaneous circuits as follows: The first circuit is traced from line wire W10, contacts R6B (Fig. 14B), wire W11, contacts C3 (Fig. 14A), wire W16; contacts R8B, R6C (Fig. 14B); wire W23, and punch magnet PM2 (Fig. 14A), to line wire W9. The energization of the punch magnet PM2 causes a second cycle of the punch to perforate the "2" hole representing one unit of justification. The second circuit is similar to the one previously traced but extends from wire W16 (Fig. 14B) through the contacts R7B, instead of through R8B, and thence through the wire W30, contacts R1C, wire W20, and magnet PM5 (Fig. 14A), to line wire W9.

The closure of contacts R6B also establishes a holding circuit for the punch clutch magnet PCM, extending from line wire W10, contacts R6B (Fig. 14B), wire W15, contacts F1C, and magnet PCM, to line wire W9. Relays SR1, SR2 are energized in parallel with magnets PM2, PM5 by circuits from line wire W16 through contacts R7A of relay R7 for relay SR1 and directly through coil SR2, to line wire W9.

Thus during each cycle of the perforating mechanism, the contacts C3 close and energize the magnets PM2 and PM5 and the relays SR1, SR2 together, a hole being punched in the "2" and "5" positions of the tape T for each step of advance of the relays SR1, SR2, until the relay SR1 reaches zero position and the relay SR2 has advanced the wiper 113 to a position of coincidence with the setting of the wiper 83.

The number of "5" holes which will be punched in the tape T before the relay SR1 reaches the zero position will depend upon the difference of the total number of spaces in the line and fifteen. When relay SR1 reaches zero, the contacts SR3 will be opened thereby breaking the holding circuit for the relay R7, opening contacts R7A and stopping the pulsing of the relay SR1 and the magnet PM5. However, the stepping of the relay SR2 will continue until its wiper 113 coincides with the setting of the wiper 83. When this happens, a circuit will be established as follows: Line wire W10, the wiper 113 (Fig. 14B), the appropriate one of contacts 117 of relay SR2, a wire W25 to the corresponding contact 82, the wiper 83, wire 29, relay R8, and contacts R6D to line wire W9.

The energization of relay R8 opens contacts R8B and stops the further pulsing of the magnet PM2 by contacts C3. The energization of relay R8 closes contacts R8A and establishes a holding circuit for relay R8 from line wire W10, through contacts R6D, to line wire W9. However, this does not interfere with the further pulsing of the relay SR2 which continues to advance until the wiper 113 reaches the 22nd contact 117 thereby closing a circuit from line wire W10, the wiper 113, wire W21, and magnet PM4 (Fig. 14A), to line wire W9. This causes a hole to be punched in the "4" position of the tape representing a carriage return operation. The relay SR2 continues to be stepped forwardly since nothing has happened to deenergize the punch clutch magnet PCM, this being maintained by relay R6 which has not yet deenergized.

When the wiper 113 engages the 26th contact a circuit is established from line wire W10, through wire W14 and the carriage return solenoid CRS, to line wire W9. This causes the carriage return key CRK of the typewriter to be drawn downwardly and effects the return of the carriage in the usual way. The relay SR2 now continues to step forwardly to the zero contact 117 and as the wiper 113 rides onto the zero contact, the contacts SRC1 open and deenergize relay R6 thereby stopping further impulsing of the relay SR2.

When the relay R6 is energized by depressing key JKC, the relay R9 (Fig. 14B) is also energized through the contacts R6B, across the line wires W9, W10, thereby maintaining contacts R9A open throughout the period during which the relays SR1, SR2 are being stepped and the justification holes and the carriage return hole punched in the tape according to the description above. The result is that, when the carriage return key CRK is operated in consequence of the energization of the carriage return solenoid CRS as mentioned above, the closure of contacts CRC1, CRC2, has no effect. However, when the circuits have been restored to normal by the deenergization of relay R6, contacts R9A close since relay R9 depends upon relay R6. If subsequently the carriage return key CRK is depressed by hand, it will cause the magnet PM3 to be selected to punch the code representation for line space and is used only to line-space the platen. The circuit established by the contacts CRC2 extends from the line wire W10 (Fig. 14A); contacts C1, PR1B; wire W17, contacts R9A, wire W18, contacts CRC2, wire W22, and magnet PM3, to line wire W9. This causes the perforating mechanism to operate one cycle and perforate a hole in the "3" position of the tape to denote a line space. During this cycle, the contacts C2 close and energize the relay PR1 across the line wires W9, W10, thereby opening the contacts PR1B and closing the contacts PR1A. The opening of contacts PR1B interrupts the circuit through the contacts C1 and the punch magnet PM3 and keeps this circuit open as long as the contacts PRC2 remain closed thereby preventing repeated punching of a "3" hole.

In many cases it may happen that a line contains more than fourteen spaces. This often happens when matter like dates or numerical data is given which requires a lot of spaces to separate the parts of the data. Under these conditions the relay SR1 will be advanced fourteen spaces in typing the line and, when it arrives at the 14th position, the cam 112a will open the contacts SRC3 and deenergize the relay R7, thus preventing further impulses from reaching the relay SR1. Since the relay SR1 is now only one step short of the zero position, the subsequent depression of the justification key JK will cause the relay SR1 to be advanced only one step to the zero position, thus causing a single "5" hole to be punched in the tape T. In the automatic justifying machine, this hole will cause all of the justification of the preceding line to be effected in the first fourteen spaces of the line. The manner in which this is brought about is explained in copending application Serial No. 636,525.

It may also happen that a typewritten line may terminate exactly at the desired margin making it unnecessary to justify that line and, in this case, the wiper 83 will come to rest upon the 21st contact 82. When the justification key JK is depressed under these conditions, twenty-one "2" holes will be punched in the tape T, since the wiper 113 will be advanced to the 21st contact 82 before perforating of "2" holes stops. On the other hand, it may happen that the writing of the line leaves the wiper 83 at the zero position (Fig. 14B). In this case, no justification can be effected since there is no zero contact 82 and it will be necessary for the operator to delete the line in a manner to be explained hereinafter and retype it with enough added spaces or an additional word or sufficient characters to carry the wiper 83 onto one of the other contacts 82.

In a case where the line completes the paragraph or for some other reason, the line does not require justification, the key SK is depressed to return the carriage. This, of course, will start a cycle of operation of the stepping relay SR2 as first described above during which a succession of feed holes and a carriage return hole will be punched and the relays SR1, SR2 restored to zero without punching justification holes.

It will be seen that the starting key SK serves not only to condition the system for writing the first line of the draft but is also used to place the system in readiness for writing the next line when a line is not to be justified. If the operator observes that the line comes out even and does not require justification, the key SK may be used instead of the justification key JK.

In cases where a line does not require justification, it is desirable that the tape T be fed sufficiently to make the section of tape corresponding to that line of approximately the same length as a line which requires justification. The reason for this is that in the automatic justifying system disclosed in copending application Serial No. 636,525, it is necessary to pre-sense the justification holes for a particular section of tape so as to set the justification mechanism in advance of the sensing of the code designations for the characters of the line and this is done in the copending application by providing a loop of tape and two sensing stations. For the same reason, it is desirable to finish a line by typing a row of X's or using the space bar, before depressing the delete key.

In order to maintain the required loop in the tape, before depressing key SK, the operator depresses the automatic feed key AFK (Fig. 14A) thereby closing contacts AFC. This connects the line wire W10 to the clutch magnet PCM through the contacts AFC and FIC and causes the perforating mechanism to operate idly to punch feed holes as long the the key AFK is held depressed by the operator. Actually only a momentary depression of the key AFK is required in most cases because the perforating mechanism operates with such speed that several feed perforations will always be made, even when the operator releases the key AFK as quickly as possible. Thus, in most cases, a depression of the key AFK of one or two seconds' duration will be more than sufficient to produce the desired loop. This will be followed by depression of the key SK to return the carriage and effect the other operations described above controlled by this key.

Fig. 19 shows a section of tape which is complete with respect to one line and it will be noted that each section of the tape begins and terminates with a carriage return hole in the "4" position of the tape. It is desirable therefore, for the reasons stated above that the length of tape between two successive carriage return holes should be maintained approximately constant at a minimum which will depend upon the line length in the copy. If the line section of tape has more feed holes, that is, happens to be longer per line than the desired length, no harm will be done but if the tape sections are shorter, it may result in breaking the tape due to the loop being too short when the tape is run through the justifying system.

It may happen in the course of writing a line that the operator discovers a mistake has been made as, for instance, in typing the wrong letter, or the carriage may have been spaced beyond the justification zone so that it can not be justified for lack of any provision in the automatic justifier system for shortening a line which is too long. Provision is made for terminating the punching and writing of a given line with the punching of a delete signal which, as will be seen restores the stepping relays SR1, SR2 to the zero position and returns the typewriter carriage to left-hand marginal position. The manner in which these various functions are accomplished will now be explained in detail.

When the error is discovered, the operator depresses the delete key DK and establishes a circuit as follows: line wire W10, contacts DKC (Fig. 14A), wire W5, and relay R3P (Fig. 14B), to line wire W9. At this point it should be remembered that, in the course of writing the erroneous line, the stepping relay SRC1 will have been advanced to accumulate spaces and the contacts SRC3 will have been closed. This causes relay R2 to be energized, the energization occurring with the first step of movement of the relay, and the circuit is traced as follows: Line wire W10, contacts SRC3 (Fig. 14B), wire W28, and the coil of relay R2, to line wire W9. Thus, when relay R3 is energized as described, the closure of contacts R3A enables a holding circuit to be established for coil R3H, across the line wires W9, W10, through the contacts R3A.

R2A. Thus, the delete key DK may be released.

The closure of contacts R3B enables a circuit to be established from line wire W10; through the contacts C1, PR1B (Fig. 14A); wire W11, contacts R3B (Fig. 14B), wire W24, and punch magnet PM1 (Fig. 14A), to line wire W9. The energization of the punch magnet PM1 causes the perforating mechanism to start and punch a hole in the "1" position of the tape to denote the fact that the line preceding it is to be deleted or skipped when the tape is subsequently used in the justifying system. Closure of the contacts R3D enables a circuit to be established from line wire W10, through contacts R3D (Fig. 14B), to wire W12, contacts C4 (Fig. 14A), wire W6, and relay SR1, to line wire W9. The contacts C4 close once per revolution of the shaft 298 and are operated continuously by the punch motor PM. Thus, the relay SR1 starts to step the cams 111a, 112a in a forward direction and this action continues until the relay SR1 reaches zero position, at which point the contacts SRC3 open and break the holding circuit for the relay R2 which, in turn, breaks the holding circuit for relay R3, thereby disconnecting the contacts C4 from the relay SR1.

At this point it should be remarked that the contacts SRC4 are closed until the 14th step of movement of the relay SRC1, consequently, the relay R4 is normally kept energized by a branch circuit from contacts SRC3 through contacts SRC4, and the coil of relay R4 to the line wire W9. However, the contacts SRC4 will open momentarily just before the contacts SRC3 open, this occurring with the 14th step of relay SR1, thereby deenergizing relay R4 and allowing the contacts R4A to close. This enables the carriage return solenoid CRS to be energized over a circuit as follows: Line wire W10, contacts R3D (Fig. 14B), contacts R4A, wire W14, and solenoids CRS (Fig. 14A), to line wire W9. This causes an operation of the carriage return mechanism to return the carriage and incidentally causes the contacts CRC1, CRC2 to be closed. However, in this case it is not desired to punch a carriage return hole in the tape in the "4" position and the relay PR1 functions to prevent this.

When the relay R3 is energized by the depression of the delete key DK, the contacts R3C close and energize the relay PR1 by a circuit from line wire W10, through contacts R3C (Fig. 14B), wire W4, and the coil of relay PR1 (Fig. 14A), to line wire W9, which circuit is held until relay R3 is deenergized by the opening of the contacts SRC3. Thus contacts PR1B are held open during the entire time that the relay SRC1 is being set to zero. Since the circuit for the carriage return code perforation through magnet PM4 must pass through the contacts PR1B, it is evident that the closure of contacts R4A, occurring just before the relay SR1 reaches zero, returns the carriage by energizing magnet CRS but relay PR1 prevents the closure of contacts CRC2 from energizing the magnet PM4. Thus the only effect of depressing the delete key is to restore relay SR1, punch the delete hole in the tape, and return the carriage. At this time, the relay SR2 is in the zero position and it is not necessary to restore this relay.

The punching of the justification holes as two separate parallel successions of rows of holes enables simple stepping relays or switches to be used which may be reset by stepping them forwardly, thereby simplifying the construction and operation of the automatic justifying typewriter and increasing its speed.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A machine of the class described, comprising a typewriting machine having a keyboard and a carriage, means controlled by the keyboard for perforating a record tape to represent the keys of the keyboard operated in composing a line on the keyboard, means to count the number of spaces between words in the composed line, means controlled by the carriage for measuring the length of a composed line, and means controlled by the counting and composing means for controlling the tape perforating means to perforate said tape with successions of holes to represent the line length and number of word spaces, respectively.

2. In combination, a typewriter having a keyboard including character keys and function keys such as a carriage return and a word space key; means to perforate a code tape under control of said keys to represent the characters and functions involved in composing a line on said typewriter, including means to automatically feed said tape a fixed minimum extent after each operation of perforating the code for a selected character or function; a special key, and means controlled by said special key for causing an operation of the carriage return key to return the carriage of the typewriter and to control the spacing means to space the tape a fixed number of times greater than the spacing of the code perforations, said special key controlled means also being operative to control the tape perforating means to perforate the carriage return code at a predetermined point in the length of tape fed under control of the key controlled means.

3. A machine for preparing a control record for typographical machines, comprising a typewriting machine having a keyboard, typing means, and a carriage for a copy sheet; means controlled by said keyboard for perforating a record tape to represent a line of composition written on said copy sheet by said typing means under control of said keyboard; means to count the word spaces in the composed line, an error key, and means controlled by the error key for causing the perforating means to perforate the tape to mark a point of error and to both reset said counting means and cause the return of said carriage.

4. In a typographical composing machine, means to prepare a control tape for controlling another typographical machine including means to place character and function representations on said tape including a line-end representation, means to compute a justification factor while placing character representations on the tape, an error correction control, and means rendered effective by the error correction control for resetting said computing means and controlling the representation placing means to error mark the tape to signify that the section of tape between said error mark and the preceding line-end representation contains an error.

5. A line composing machine comprising a variable spacing typewriter including typing means, a carriage for a composition receiving work sheet, means to return the carriage, and a keyboard having character keys for controlling the typing means, at least one line-end marking key, and an error key; means controlled by the character and line-end keys for marking a record strip to represent a line composed by typing it on said work sheet and to mark the end of the line, means controlled by the line-end marking key to return the carriage, means controlled by the error key for controlling the marking means to mark the record strip to indicate that an error occurs between the last preceding line-end mark and the error mark, and means controlled by the error key for returning the carriage after error marking the record strip.

6. A typographical composing machine comprising a typewriter having a keyboard for composing a line by typing said line on a work sheet, a justification key, a non-justification key, means controlled by said keyboard for recording a succession of character and space representations on a record tape concurrently with the typing of the line on the work sheet, means for measuring the length of a composed line, means for counting the word spaces in a composed line; means initiated by the justification key and controlled by the measuring and counting means for controlling the recording means to record in said tape representations of the line length and number of spaces, respectively; and means controlled by the non-justification key for causing resetting of the counting means and preventing recording of the line length and spaces representations in the tape.

7. In combination, a typewriting machine having a carriage, typing means, and a keyboard; means for perforating a code tape including a series of code punches, each code punch having a selecting magnet; contact means controlled by said keyboard for selecting said magnets singly or in combinations to represent characters and machine functions as they occur in typing a line, contact means settable by the carriage in line writing movement for measuring the length of the line, word space counting means including a contact device settable to represent the number of word spaces in a line, a justification key, and means controlled by said key for placing the selecting magnets under control of the carriage actuated contact means and the contact device whereby to punch said tape in accordance with the settings of the line measuring and word space counting means.

8. In a typographical line composing machine, means to type on a work sheet a line of characters to be justified including a work sheet carriage, means to mark a record strip with a sequence of designations to represent the typed line, means actuated by the carriage to measure the length of the typed line, means to count the word spaces in the typed line, a justification key, and means automatically operative when the justification key is operated for placing the marking means under control of the measuring and counting means whereby to mark the record strip in two different places separately to represent the length of the typed line and the number of word spaces in the line.

9. A machine of the class described, comprising a typewriting machine having a keyboard and a carriage, means controlled by the keyboard for perforating a record tape to represent the keys of the keyboard operated in composing a line on the keyboard, means to count the number of spaces between words in the composed line, means controlled by the carriage for measuring the length of a composed line, and means controlled by the counting and composing means for controlling the tape perforating means to perforate said tape with two successions of perforations, the number of perforations in said successions representing the values measured and counted, respectively.

10. In combination, means to compose a line; means for preparing a control tape under control of said composing means, including means to place designations in said tape representing the characters in said line; means settable under control of the composing means to represent a plurality of factors of justification, and sequence control means controlled by the settable means and operable to control said placing means to place in said tape a plurality of sequences of designations representing said factors of justification, each sequence representing a single factor of justification, said sequence control means also controlling the placing means to place a line-end designation after said sequences.

11. A machine for preparing a control tape for automatic typographical machines, comprising code perforating means for making code perforations in said tape representing the characters of a line of composition to be automatically justified in the typographical machine, means to compose said line and control said perforating means to perforate the tape with a sequence of character code perforations, factor of justification storing means automatically effective during the composing of a line to store a plurality of factors of justification, means to place the code perforating means under control of said storing means to automatically perforate the tape to represent the stored factors of justification, and means automatically effective after the factor of justification perforations have been made to cause the perforating means to code perforate the tape to signify the end of the line.

12. A machine for preparing a control record for automatic typographical machines, comprising means for making marks in said record representing the characters of a line of composition to be automatically justified in the typographical machine, means to compose said line and control said marking means to mark the record with a sequence of character designating marks, factor of justification storing means automatically effective during the composing of a line to store a plurality of factors of justification, means to place the marking means under control of said storing means to semi-automatically mark the record to represent the stored factors of justification, and means semi-automatically effective after the factor of justification perforations have been made to cause the marking means to mark the record to signify the end of the line.

13. A machine for preparing a control record for typographical machines, comprising a typewriting machine having a keyboard, typing means, and a carriage for a copy sheet; means controlled by said keyboard for marking a record strip to represent a line of composition written on said copy sheet by said typing means under control of said keyboard; means to count the word spaces in the composed line, an error key, and means controlled by the error key for causing the marking means to mark the strip to indicate a point of error and to both reset said counting means and cause the return of said carriage.

14. In combination, a typewriting machine having a carriage, typing means, and a keyboard; means for placing designations in a record strip including a series of marking devices, each device having a selecting magnet; contact means controlled by said keyboard for selecting said magnets to mark said strip to represent characters and machine functions as they occur in typing a line, contact means settable by the carriage in line writing movement for measuring the length of the line, word space counting means including a contact device settable to represent the number of word spaces in a line, a justification key, and means controlled by said key for placing the selecting magnets under control of the carriage actuated contact means and the contact device whereby to mark said tape in accordance with the settings of the line measuring and word space counting means.

15. In combination, a typewriter having a keyboard including character keys and function keys such as a carriage return and a word space key; means to mark a record medium under control of said keys to represent the characters and functions involved in composing a line on said typewriter, including means to automatically feed said tape a fixed minimum extent after each operation of marking the record medium for a selected character or function; a special key, and means controlled by said special key for causing an operation of the carriage return key to return the carriage of the tyepwriter and to control the spacing means to space the record medium a fixed number of times greater than the spacing of the markings, said special key controlled means also being operative to control the marking means to mark the carriage return at a predetermined point in the length of record medium fed under control of the key controlled means.

RONALD D. DODGE.

REFERENCES CITED

The following references are of record in the file of this patent:

UNITED STATES PATENTS

| Number | Name | Date |
|---|---|---|
| Re. 21,505 | Green | July 9, 1940 |
| 742,523 | Timmis | Oct. 27, 1903 |
| 915,553 | Church | Mar. 16, 1909 |
| 970,694 | Drewell | Sept. 20, 1910 |
| 988,984 | Drewell | Apr. 11, 1911 |
| 1,001,825 | Drewell | Aug. 29, 1911 |
| 1,136,080 | Cornwall | Apr. 20, 1915 |
| 1,136,081 | Moore | Apr. 20, 1915 |
| 2,183,820 | Nelson | Dec. 19, 1939 |